United States Patent
Yashiki

(10) Patent No.: US 10,026,940 B2
(45) Date of Patent: Jul. 17, 2018

(54) ASSEMBLY PRODUCTION METHOD

(71) Applicant: Sumitomo Chemical Company, Limited, Chuo-Ku, Tokyo (JP)

(72) Inventor: Daizaburo Yashiki, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 10 days.

(21) Appl. No.: 15/416,412

(22) Filed: Jan. 26, 2017

(65) Prior Publication Data

US 2017/0222202 A1 Aug. 3, 2017

(30) Foreign Application Priority Data

Jan. 29, 2016 (JP) .................................. 2016-016004
Jan. 13, 2017 (JP) .................................. 2017-004306

(51) Int. Cl.
| | | |
|---|---|---|
| H01M 2/14 | (2006.01) | |
| H01M 10/0525 | (2010.01) | |
| B65B 11/00 | (2006.01) | |

(52) U.S. Cl.
CPC ............. *H01M 2/145* (2013.01); *B65B 11/00* (2013.01); *H01M 10/0525* (2013.01)

(58) Field of Classification Search
CPC .. H01M 2/1077; H01M 2/1083; H01M 2/206; H01M 2220/20; B60K 2001/0405; B60R 16/04

See application file for complete search history.

(56) References Cited

U.S. PATENT DOCUMENTS

| | | |
|---|---|---|
| 2009/0166235 A1 | 7/2009 | Mansson et al. |
| 2014/0196634 A1 | 7/2014 | Mansson |

FOREIGN PATENT DOCUMENTS

| | | |
|---|---|---|
| JP | 2006-298455 A | 11/2006 |
| JP | 2009274766 A | 11/2009 |
| JP | 2010-274922 A | 12/2010 |
| JP | 2011236957 A | 11/2011 |
| JP | 3195120 U | 12/2014 |
| KR | 20020039899 A | 5/2002 |
| KR | 20090013232 A | 2/2009 |
| KR | 20140050615 A | 4/2014 |
| WO | 2008/123124 A1 | 10/2008 |

OTHER PUBLICATIONS

Office Action dated Jul. 4, 2017 in KR Application No. 1020170012588.
Notice of Allowance dated Nov. 2, 2017 in KR Application No. 1020170012588.

*Primary Examiner* — Brittany Raymond
(74) *Attorney, Agent, or Firm* — Panitch Schwarze Belisario & Nadel LLP

(57) ABSTRACT

According to the present invention, a core member hardly falls off from a lateral plate for protecting an end surface of a roll, and abrasion dust is less likely to be generated. The core member having a length $L_3$ is passed through four rolls each of which is obtained by winding a separator on a core and has a width $L_1$ and five buffering materials each of which has a thickness $L_2$, a protruding section which is included in a protector and has a height $L_4$ is inserted into the core member, and $L_4 > 4L_1 + 5L_2 - L_3 > 0$ holds true.

17 Claims, 11 Drawing Sheets

ASSEMBLY PRODUCTION METHOD

This Nonprovisional application claims priority under 35 U.S.C. § 119 on Patent Application No. 2017-004306 filed in Japan on Jan. 13, 2017 and on Patent Application No. 2016-016004 filed in Japan on Jan. 29, 2016, the entire contents of which are hereby incorporated by reference.

TECHNICAL FIELD

The present invention relates to an assembly production method for assembling a roll of a wound film and to an assembly.

BACKGROUND ART

A lithium-ion secondary battery includes therein a positive electrode and a negative electrode which are separated by a porous separator. In production of lithium-ion secondary batteries, a separator roll is used which is obtained by winding this separator around a core having a cylindrical shape.

In production of lithium-ion secondary batteries, intrusion of dust is fatal, and therefore the separator roll is packaged such that dust would not intrude and waste which becomes dust would not be generated. Moreover, in order to enhance efficiency in transportation and packaging, one (1) core member is inserted into a plurality of separator rolls, and these components are assembled into one (1) roll assembly.

For example, in a configuration disclosed in Patent Literature 1, an inner core having a cylindrical shape is passed through a plurality of rolls, protection sheets for protecting end surfaces of the plurality of rolls, and spacers each of which is provided between adjacent two of the plurality of rolls, and those components are packaged with a packaging film. Patent Literatures 2 and 3 disclose other members which are directly engaged with shaft holes of cores in rolls so as to protect end surfaces of the rolls, as with the protection sheets.

Moreover, for example, in a configuration disclosed in Patent Literature 4, a branch pole section which protrudes from a plate-like section in a lateral direction is passed through cores of a plurality of rolls, and a buffering material is screwed to an end surface of the branch pole section so as to prevent the rolls from falling off from the branch pole section.

CITATION LIST

Patent Literature

[Patent Literature 1]
Japanese Patent Application Publication Tokukai No. 2010-274922 (Publication date: Dec. 9, 2010)
[Patent Literature 2]
Japanese Patent Application Publication Tokukai No. 2006-298455 (Publication date: Nov. 2, 2006)
[Patent Literature 3]
International Publication No. WO 2008/123124 (Publication date: Oct. 16, 2008)
[Patent Literature 4]
Japanese Registered Utility Model Publication No. 3195120 (issued on Dec. 25, 2014)

SUMMARY OF INVENTION

Technical Problem

However, those conventional techniques have the following problems.

In the configuration disclosed in Patent Literature 1, the inner core is passed through an opening provided in a center of the protection sheet, and thus the protection sheet is engaged with the inner core. This configuration has a problem that the inner core falls off from the opening by vibration in transportation and the assembly is easily disassembled. In a case where the inner core is lengthened in order to solve the problem, that is, in order to prevent the inner core from falling off from the opening, the roll assembly becomes larger in size, and this causes another problem of decreasing transportation efficiency.

In the configuration disclosed in Patent Literature 4, a knob-provided male screw jig is screwed into a female screw section that is provided in the end surface of the branch pole section, and thus the buffering material is fixed by screwing. According to the configuration, due to vibration in transportation, collision and friction are generated between a screw groove of the female screw section and a screw thread of the knob-provided male screw jig. The branch pole section and the knob-provided male screw jig are made of hard materials, and this therefore causes a problem that dust is more likely to be generated by collision and friction.

The present invention is accomplished in view of the problems, and its object is to provide a roll assembly in which a core member hardly falls off from a lateral plate for protecting an end surface of a roll and abrasion dust is hardly generated, and to provide a method for producing such a roll assembly.

Solution to Problem

In order to attain the object, an assembly production method in accordance with an aspect of the present invention includes: a first inserting step of inserting a first protruding section into one end of a core member, the first protruding section protruding from a first base section that is included in a first lateral plate and has a plate-like shape, the first protruding section having a length of $L_4$ and the core member having a length of $L_3$ in a passing-through direction in which the core member is passed through one or more plate members and one or more rolls each of which is obtained by winding a film on a core, and $L_3 > L_4$ holding true; and a passing-through step of passing the core member through the one or more rolls and the one or more plate members such that $L_3 + L_4 > L_{1,sum} + L_{2,sum} > L_3$ holds true, where $L_{1,sum}$ is a total length of the one or more rolls in the passing-through direction and $L_{2,sum}$ is a total length of the one or more plate members in the passing-through direction.

Another assembly production method in accordance with an aspect of the present invention includes: a first inserting step of inserting a first protruding section into one end of a core member, the first protruding section protruding from a first base section that is included in a first lateral plate and has a plate-like shape, the first protruding section having a length of $L_4$ and the core member having a length of $L_3$ in a passing-through direction in which the core member is passed through one or more rolls each of which is obtained by winding a film on a core, and $L_3 > L_4$ holding true; and a passing-through step of passing the core member through the one or more rolls such that $L_3 + L_4 > L_{1,sum} > L_3$ holds true, where $L_{1,sum}$ is a total length of the one or more rolls in the passing-through direction.

In an assembly in accordance with an aspect of the present invention, a first protruding section is inserted into one end of a core member, the first protruding section protruding from a first base section that is included in a first lateral plate and has a plate-like shape, the first protruding section having a length of $L_4$ and the core member having a length of $L_3$ in a passing-through direction in which the core member is passed through one or more plate members and one or more rolls each of which, is obtained by winding a film on a core, and $L_3 > L_4$ holding true; and the core member is passed through the one or more rolls and the one or more plate members such that $L_3 + L_4 > L_{1,sum} + L_{2,sum} > L_3$ holds true, where $L_{1,sum}$ is a total length of the one or more rolls in the passing-through direction and $L_{2,sum}$ is a total length of the one or more plate members in the passing-through direction.

In another assembly in accordance with an aspect of the present invention, a first protruding section is inserted into one end of a core member, the first protruding section protruding from a first base section that is included in a first lateral plate and has a plate-like shape, the first protruding section having a length of $L_4$ and the core member having a length of $L_3$ in a passing-through direction in which the core member is passed through one or more rolls each of which is obtained by winding a film on a core, and $L_3 > L_4$ holding true; and the core member is passed through the one or more rolls such that $L_3 + L_4 > L_{1,sum} > L_3$ holds true, where $L_{1,sum}$ is a total length of the one or more rolls in the passing-through direction.

Advantageous Effects of Invention

The present invention brings about, in the assembly production method for assembling a roll, an effect of inhibiting a core member from falling off from a lateral plate for protecting an end surface of the roll and an effect of hardly generating abrasion dust.

DESCRIPTION OF EMBODIMENTS

Figure 1:
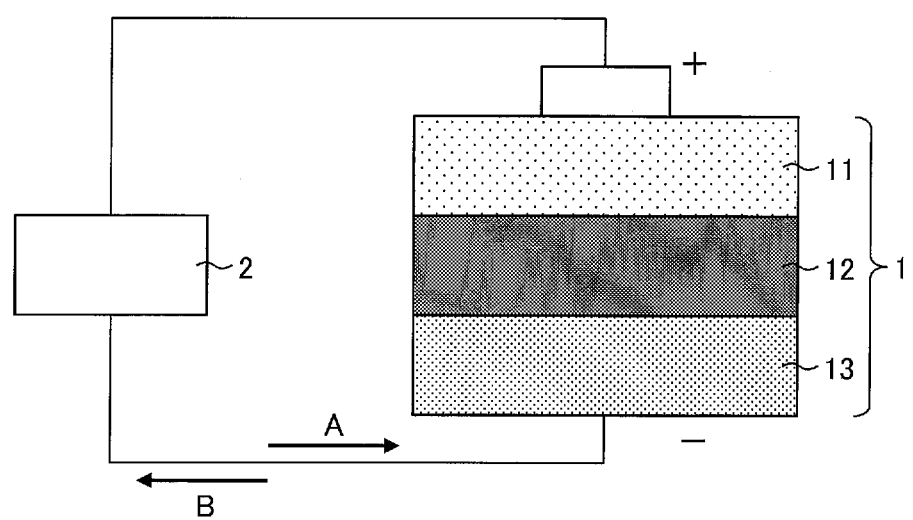
FIG. 1 is a schematic view illustrating a cross sectional configuration of a lithium-ion secondary battery.

The following description will discuss an embodiment of the present invention in detail with reference to the drawings. Note that the dimensions, materials, shapes, relative arrangements, processing methods, and the like of the configuration described in the embodiment are mere examples, and should not be construed as limiting the scope of the present invention. Further, the drawings are schematic ones, and ratios of dimensions and shapes in the drawings may be different from actual ones.

[Basic Configuration]

As regards a battery separator which is to be wound into a separator roll assembled in accordance with an embodiment of the present invention, the following description will discuss (i) a lithium-ion secondary battery, (ii) a separator, (iii) a heat-resistant separator, (iv) a method of producing the separator and the heat-resistant separator, (v) a slitting apparatus, and (vi) a cutting device, in this order, each of which is a basic component of the present invention.

(Lithium-Ion Secondary Battery)

A nonaqueous electrolyte secondary battery, typified by a lithium-ion secondary battery, has a high energy density. Therefore, the nonaqueous electrolyte secondary battery is currently and widely used as (i) batteries for use in devices such as personal computers, mobile phones, and mobile information terminals, (ii) batteries for use in moving bodies such as automobiles and airplanes, and (iii) stationary batteries contributing to stable power supply.

FIG. 1 is a schematic view illustrating a cross sectional configuration of a lithium-ion secondary battery 1. As illustrated in FIG. 1, the lithium-ion secondary battery 1 includes a cathode 11, a separator 12 (film, battery separator), and an anode 13. Between the cathode 11 and the anode 13, an external device 2 is connected outside the lithium-ion secondary battery 1. This causes (i) electrons to move in a direction A while the lithium-ion secondary battery 1 is being charged and (ii) electrons to move in a direction B while the lithium-ion secondary battery 1 is being discharged.

(Separator)

The separator 12 is provided so as to be sandwiched between (i) the cathode 11 which is a positive electrode of the lithium-ion secondary battery 1 and (ii) the anode 13 which is a negative electrode of the lithium-ion secondary battery 1. The separator 12 is a porous film which causes the cathode 11 and the anode 13 to be separated and allows lithium ions to move between the cathode 11 and the anode 13. The separator 12 is a porous film containing a polyolefin-based resin as a main component. The porous film containing a polyolefin-based resin as a main component mean a porous film in which a ratio of polyolefin-based resin in the entire porous film is normally not less than 50% by volume, preferably not less than 90% by volume, and more preferably not less than 95% by volume. The polyolefin-based resin in the porous film preferably contains a high molecular weight component whose weight-average molecular weight is $5 \times 10^5$ to $15 \times 10^6$. The porous film more preferably contains a polyolefin-based resin having a weight-average molecular weight of 1,000,000 or more because such a polyolefin-based resin increases (i) the strength of the porous film, that is, a separator for a nonaqueous electrolyte secondary battery (hereinafter referred to as a "nonaqueous electrolyte secondary battery separator") and (ii) the strength of a laminated separator for a nonaqueous electrolyte secondary battery (hereinafter referred to as a "nonaqueous electrolyte secondary battery laminated separator") including the porous film and a later described porous layer.

Examples of the polyolefin-based resin include high-molecuiar-weight homopolymers (such as polyethylene, polypropylene, and polybutene) and high-molecular-weight copolymers (such as an ethylene-propylene copolymer) which homopolymers and copolymers are each obtained by polymerizing ethylene, propylene, 1-butene, 4-methyl-1-pentene, 1-hexene, or the like. The porous film containing a polyolefin-based resin as a main component is made up of a layer containing one kind selected from those polyolefin-based resins or a layer containing two or more kinds selected from those polyolefin-based resins. In particular, among the polyolefin-based resins, a high-molecular-weight polyethylene-based resin which is mainly made of ethylene is preferable because such a polyethylene-based resin allows a flow of an excessive electric current to be prevented (shutdown) at a lower temperature. Note that the porous film can contain a component (such as an additive) other than the polyolefin-based resin, provided that the component does not hinder a function of the porous film. The additive can be an organic compound (organic additive), and the organic compound can be an antioxidant (organic antioxidant) or a lubricant.

Examples of the polyethylene-based resin encompass low-density polyethylene, high-density polyethylene, linear polyethylene (an ethylene-α-olefin copolymer), ultra-high molecular weight polyethylene having a weight-average molecular weight of not less than 1,000,000, and the like. Of these polyethylene-based resins, ultra-high molecular weight polyethylene having a weight-average molecular weight of not less than 1,000,000 is further preferable.

Figure 2:
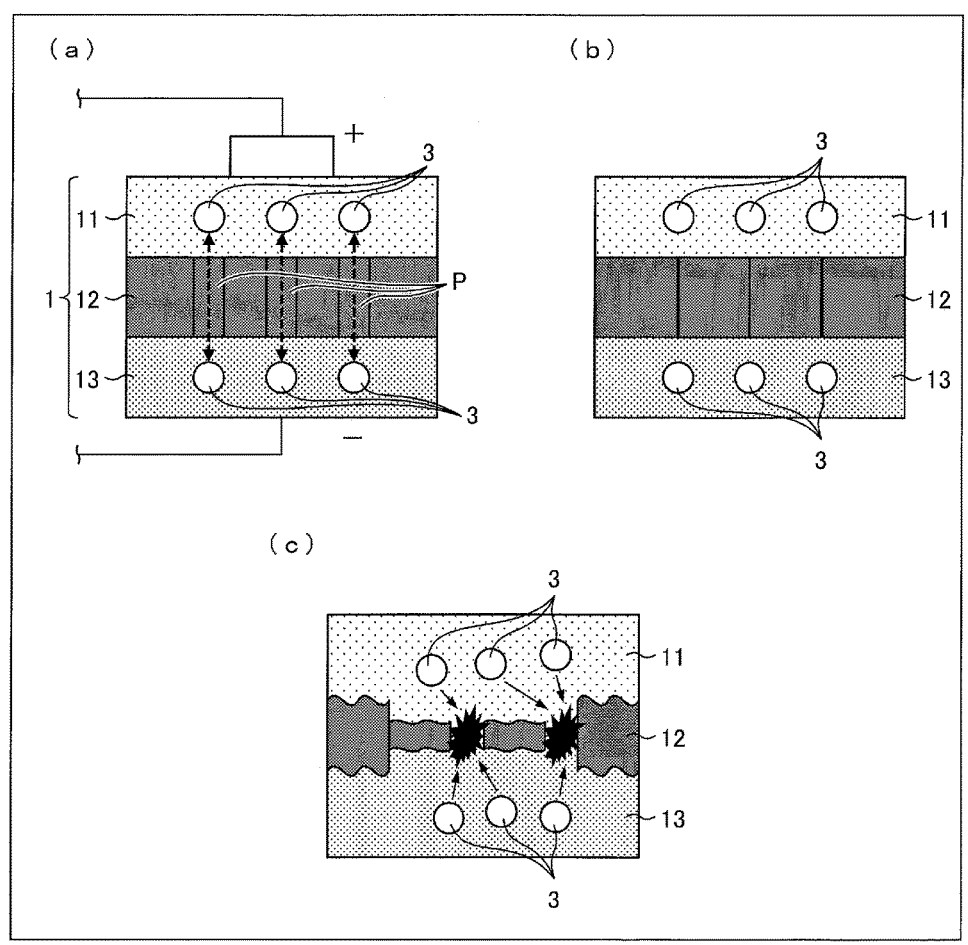
FIG. 2 is a schematic view illustrating details of the configuration of the lithium-ion secondary battery illustrated in FIG. 1.

FIG. 2 is a schematic view illustrating details of the configuration of the lithium-ion secondary battery 1 illustrated in FIG. 1. (a) of FIG. 2 illustrates a normal configuration. (b) of FIG. 2 illustrates a state in which a temperature of the lithium-ion secondary battery 1 has risen. (c) of FIG. 2 illustrates a state in which a temperature of the Lithium-ion secondary battery 1 has sharply risen. As illustrated in (a) of FIG. 2, the separator 12 has many pores P. Normally, lithium ions 3 can move back and forth in the lithium-ion secondary battery 1, through the pores P.

The temperature of the lithium-ion secondary battery 1 may rise due to, for example, excessive charging of the lithium-ion secondary battery 1 or a high current caused by short-circuiting of the external device. This causes the separator 12 to be melted or softened, so that the pores P are blocked as illustrated in (b) of FIG. 2. As a result, the separator 12 shrinks. This causes the lithium ions 3 to stop moving back-and -forth, and ultimately causes the temperature of the lithium-ion secondary battery 1 to stop rising.

Note, however, that in a case where a temperature of the lithium-ion secondary battery 1 sharply rises, the separator 12 suddenly shrinks. In this case, the separator 12 may be destroyed (see (c) of FIG. 2). This causes the lithium ions 3 to leak out from the separator 12 which has been destroyed. As a result, the lithium ions 3 do not stop moving back and forth. Consequently, the temperature continues to rise.

(Heat-resistant Separator)

Figure 3:
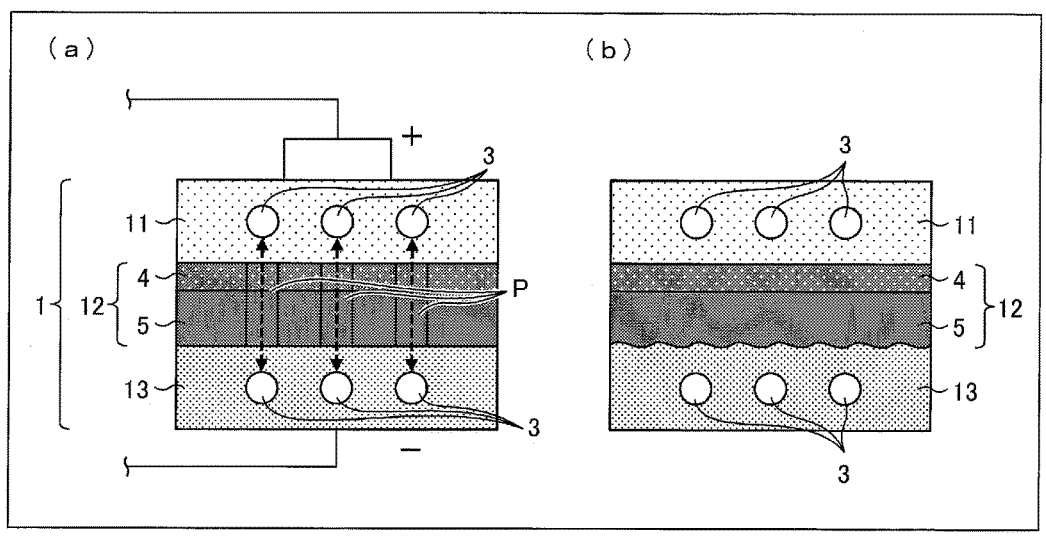
FIG. 3 is a schematic view illustrating details of another configuration of the lithium-ion secondary battery illustrated in FIG. 1.

FIG. 3 is a schematic view illustrating another configuration of the lithium-ion secondary battery 1 illustrated in FIG. 1. (a) of FIG. 3 illustrates a normal configuration, and (b) of FIG. 3 illustrates a state in which a temperature of the lithium-ion secondary battery 1 has sharply risen. As illustrated in (a) of FIG. 3, the separator 12 can be a heat-resistant separator including a porous film 5 and a heat-resistant layer 4. The heat-resistant layer 4 is stacked on a surface of the porous film 5 which surface is on a cathode 11 side. Note that the heat-resistant layer 4 can be alternatively stacked (i) on a surface of the porous film 5 which surface is on an anode 13 side or (ii) on both surfaces of the porous film 5. Furthermore, the heat-resistant layer 4 has pores which are similar to the pores P. Normally, the lithium ions 3 move back and forth through the pores P and the pores of the heat-resistant layer 4. Examples of the material of which the heat-resistant layer 4 is made include: polyolefins such as polyethylene, polypropylene, polybutene, and an ethylene-propylene copolymer; fluorine-containing resins such as polyvinylidene fluoride (PVDF) and polytetrafluoroethylene; fluorine-containing rubbers such as a vinylidene fluoride-hexafluoropropylene-tetrafluoroethylene copolymer and an ethylene-tetrafluoroethylene copolymer; aromatic polyamide; wholly aromatic polyamide (aramid resin); rubbers such as a styrene-butadiene copolymer and a hydride thereof, a methacrylate ester copolymer, an acrylonitrile-acrylic ester copolymer, a styrene-acrylic ester copolymer, ethylene propylene rubber, and polyvinyl acetate; resins having a melting point or a glass transition temperature of not less than 180° C., such as polyphenylene ether, polysulfone, polyether sulfone, polyphenylene sulfide, polyetherimide, polyamide-imide, polyether amide, polyester, and polyester amide; water-soluble polymers such as polyvinyl alcohol, polyethylene glycol, cellulose ether, sodium alginate, polyacrylic acid, polyacrylamide, and polymethacrylic acid; and the like.

Specific examples of the aromatic polyamides include poly(paraphenylene terephthalamide), poly(methaphenylene isophthalamide), poly(parabenzamide), poly(methabenzamide), poly(4,4'-benzanilide terephthalamide), poly(paraphenylene-4,4'-biphenylene dicarboxylic amide), poly(methaphenylene-4,4'-biphenylene dicarboxylic amide), poly(paraphenylene-2,6-naphthalene dicarboxylic amide), poly(methaphenylene-2,6-naphthalene dicarboxylic amide), poly(2-chloroparaphenylene terephthalamide), a paraphenylene terephthalamide/2,6-dichloroparaphenylene terephthalamide copolymer, and a raethaphenylene terephthalamide/2,6-dichloroparaphenylene terephthalamide copolymer. Out of these aromatic polyamides, poly(paraphenylene terephthalamide) is more preferable.

Out of the above resins, a polyolefin, a fluorine-containing resin, an aromatic polyamide, or a water-soluble polymer is more preferable. In a case where the porous layer is provided so as to face a cathode of a nonaqueous electrolyte secondary battery, a fluorine-containing resin is particularly preferable. Use of a fluorine-containing resin makes it easy to maintain various performance capabilities such as a rate characteristic and a resistance characteristic (solution resistance) of the nonaqueous electrolyte secondary battery even in a case where a deterioration in acidity occurs while the nonaqueous electrolyte secondary battery is being operated. A water-soluble polymer, which allows water to be used as a solvent to form the porous layer, is more preferable in terms of a process or an environmental load, cellulose ether and sodium alginate are further preferable, and cellulose ether is particularly preferable.

Specific examples of the cellulose ether encompass; carboxymethyl cellulose (CMC), hydroxy ethyl cellulose (HEC), carboxyethyl cellulose, methyl cellulose, ethyl cellulose, cyanoethyl cellulose, oxyethyl cellulose, and the like. The cellulose ether is more preferably CMC or HEC and particularly preferably CMC, because CMC and HEC less degrade in use over a long term and are excellent in chemical stability.

The heat-resistant layer more preferably contains a filler. In a case where the heat-resistant layer contains a filler, the resin functions as a binder resin. The filler is not particularly limited to a specific one and can be a filler made of an organic matter or a filler made of an inorganic matter.

Specific examples of the filler made of an organic matter include fillers made of (i) a homopolymer of a monomer such as styrene, vinyl ketone, acrylonitrile, methyl methacrylate, ethyl methacrylate, glycidyl methacrylate, glycidyl aerylate, or methyl acrylate, or (ii) a copolymer of two or more of such monomers; fluorine-containing resins such as polytetrafluoroethylene, an ethylene tetrafluoride-propylene hexafluoride copolymer, a tetrafluoroethylene-ethylene copolymer, and polyvinylidene fluoride; melamine resin; urea resin; polyethylene; polypropylene; polyacrylic acid and polymethaerylic acid; and the like.

Specific examples of the filler made of an inorganic matter include fillers made of inorganic matters such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, boehmite, magnesium hydroxide, calcium oxide, magnesium oxide, titanium oxide, titanium nitride, alumina (aluminum oxide), aluminum nitride, mica, zeolite, and glass. The heat-resistant layer can contain (i) only one kind of filler or (ii) two or more kinds of fillers in combination.

Among the above fillers, a filler made of an inorganic matter is suitable. A filler made of an inorganic oxide such as silica, calcium oxide, magnesium oxide, titanium oxide, alumina, mica, zeolite, aluminum hydroxide, or boehmite is preferable. A filler made of at least one kind selected from the group consisting of silica, magnesium, oxide, titanium oxide, aluminum hydroxide, boehmite, and alumina is more preferable. A filler made of alumina is particularly preferable. Alumina has many crystal forms such as α-alumina, β-alumina, γ-alumina, and θ-alumina, and any of the crystal forms can be suitably used. Among the above crystal forms, α-alumina, which is particularly high in thermal stability and chemical stability, is the most preferable.

The filler has a shape that varies depending on, for example, (i) a method for producing the organic matter or inorganic matter as a raw material and (ii) a condition under which the filler is dispersed during preparation of a coating solution for forming the heat-resistant layer. The filler can have any of various shapes such as a spherical shape, an oblong shape, a rectangular shape, a gourd shape, and an indefinite irregular shape.

In a case where the heat-resistant layer contains a filler, the filler is contained in an amount preferably of 1% by volume to 99% by volume and more preferably of 5% by volume to 95% by volume of the heat-resistant layer. The filler which is contained in the heat-resistant layer in an amount falling within the above range makes it less likely for a void formed by a contact among fillers to be blocked by, for example, a resin. This makes it possible to obtain sufficient ion permeability and to set a mass per unit area of the heat-resistant layer at an appropriate value.

Even in a case where the porous film 5 is melted or softened due to a sharp rise in temperature of the lithium-ion secondary battery 1, the shape of the porous film 5 is maintained (see (b) of FIG. 3) because the heat-resistant layer 4 supports the porous film 5. This causes the porous film 5 to come off with melting or softening and accordingly the pores P are merely blocked up. This causes the lithium ions 3 to stop moving back and forth, and ultimately causes the above-described excessive discharging or excessive charging to stop. In this way, the separator 12 is prevented from being destroyed.

(Production Steps of Separator and Heat-resistant Separator)

How to produce the separator and the heat-resistant separator of the lithium-ion secondary battery 1 is not specifically limited. The separator and the heat-resistant separator can be produced by a publicly known method. The following discussion assumes a case where the porous film 5 contains polyethylene as a main material. Note, however, that even in a case where the porous film 5 contains another material, the separator 12 (heat-resistant separator) can be produced by employing a similar production method.

Examples of such a similar production method encompass a method which includes the steps of forming a film by adding an inorganic filler or a plasticizer to a thermoplastic resin, and then removing (cleaning) the inorganic filler or the plasticizer by means of an appropriate solvent. For example, in a case where the porous film 5 is a polyolefin separator made of a polyethylene resin containing ultrahigh molecular weight polyethylene, it is possible to produce the porous film 5 by the following method.

This method includes (1) a kneading step of obtaining a polyethylene resin composition by kneading a ultra-high molecular weight polyethylene with (i) an inorganic filler (such as calcium carbonate or silica) or (ii) a plasticizer (such as low molecular weight polyolefin or fluid paraffin), (2) a rolling step of forming a film by means of the polyethylene resin composition, (3) a removal step of removing the inorganic filler or the plasticizer from the film obtained in the step (2), and (4) a stretching step of obtaining the porous film 5 by stretching the film obtained in the step (3). The step (4) can be alternatively carried out between the steps (2) and (3).

In the removal step, many fine pores are formed in the film. The fine pores of the film stretched in the stretching step serve as the above-described pores P. The porous film 5 (separator 12 having no heat-resistant layer) is thus obtained, which is a polyethylene micro porous film having a certain thickness and a certain air permeability.

Note that, in the kneading step, (i) 100 parts by weight of the ultra-high molecular weight polyethylene, (ii) 5 parts by weight to 200 parts by weight of a low-molecular weight polyolefin having a weight-average molecular weight of 10,000 or less, and (iii) 100 parts by weight to 400 parts by weight of the inorganic filler can be kneaded.

Thereafter, in a coating step, the heat-resistant layer 4 is formed on a surface of the porous film 5. For example, by applying, onto the porous film 5, an aramid/NMP (N-methylpyrrolidone) solution (coating solution), the heat-resistant layer 4 that is an aramid heat-resistant layer is formed. The heat-resistant layer 4 can be formed on only one surface or both surfaces of the porous film 5. Alternatively, the heat-resistant layer 4 can be formed on the porous film 5 by applying, on the porous film 5, a mixed solution containing a filler such as alumina/carboxymethyl cellulose.

Note that, in the coating step, an adhesive layer can be formed on the surface of the porous film 5 by applying a vinylidene polyfluoride/dimethyl acetoamide solution (coating solution) on the surface of the porous film 5 (application step) and solidifying the vinylidene polyfluoride/dimethyl acetoamide solution (solidifying step). The adhesive layer can be formed on only one surface of the porous film 5 or on both surfaces of the porous film 5.

A method of coating the porous film 5 with a coating solution is not specifically limited, provided that uniform wet coating can be carried out by the method. The method can be a conventionally well-known method such as a capillary coating method, a spin coating method, a slit die coating method, a spray coating method, a dip coating method, a roll coating method, a screen printing method, a flexo printing method, a bar coater method, a gravure coater method, or a die coater method. The heat-resistant layer 4 has a thickness which can be controlled by adjusting a thickness of a coating wet film or a solid-content concentration in the coating solution.

It is possible to use a resin film, a metal belt, a drum or the like as a support with which the porous film 5 is fixed or transferred in coating.

It is thus possible to produce the separator 12 (heat-resistant separator) in which the heat-resistant layer 4 is stacked on the porous film 5. The separator thus produced is wound around a core having a cylindrical shape. Note that a subject to be produced by the above production method is not limited to the heat-resistant separator. The above production method does not necessarily include the coating step. In a case where no coating step is included in the method, the subject to be produced is a separator having no heat-resistant layer. Alternatively, an adhesive separator having other functional layer (such as later-described adhesive layer), instead of the heat-resistant layer, can be produced by a production method similar to that of the heat-resistant separator.

(Slitting Apparatus)

The heat resistant separator or the separator including no heat resistant layer (hereinafter, referred to as "separator") preferably has a width (hereinafter, referred to as "product width") suitable for application products such as the lithium-ion secondary battery 1. Note, however, that the separator is produced so as to have a width that is equal to or larger than a product width, in view of an improvement in productivity. After the separator is once produced, the separator is slit into a separator(s) having the product width.

Note that the "separator width" means a length of the separator in a direction substantially perpendicular to a machine direction and a thickness direction of the separator. Hereinafter, a wide separator, which has not subjected to slitting, is referred to as an "original sheet," whereas particularly a separator which has been subjected to slitting is referred to as a "slit separator." Note also that, (i) "slitting" means to slit the separator in the machine direction (flow direction of the film during production; MD: Machine direction) and (ii) "cutting" means to cut the separator in a transverse direction (TD). Note that the transverse direction (TD) means a direction which is substantially perpendicular to the machine direction (MD) and the thickness direction of the separator.

Figure 4:
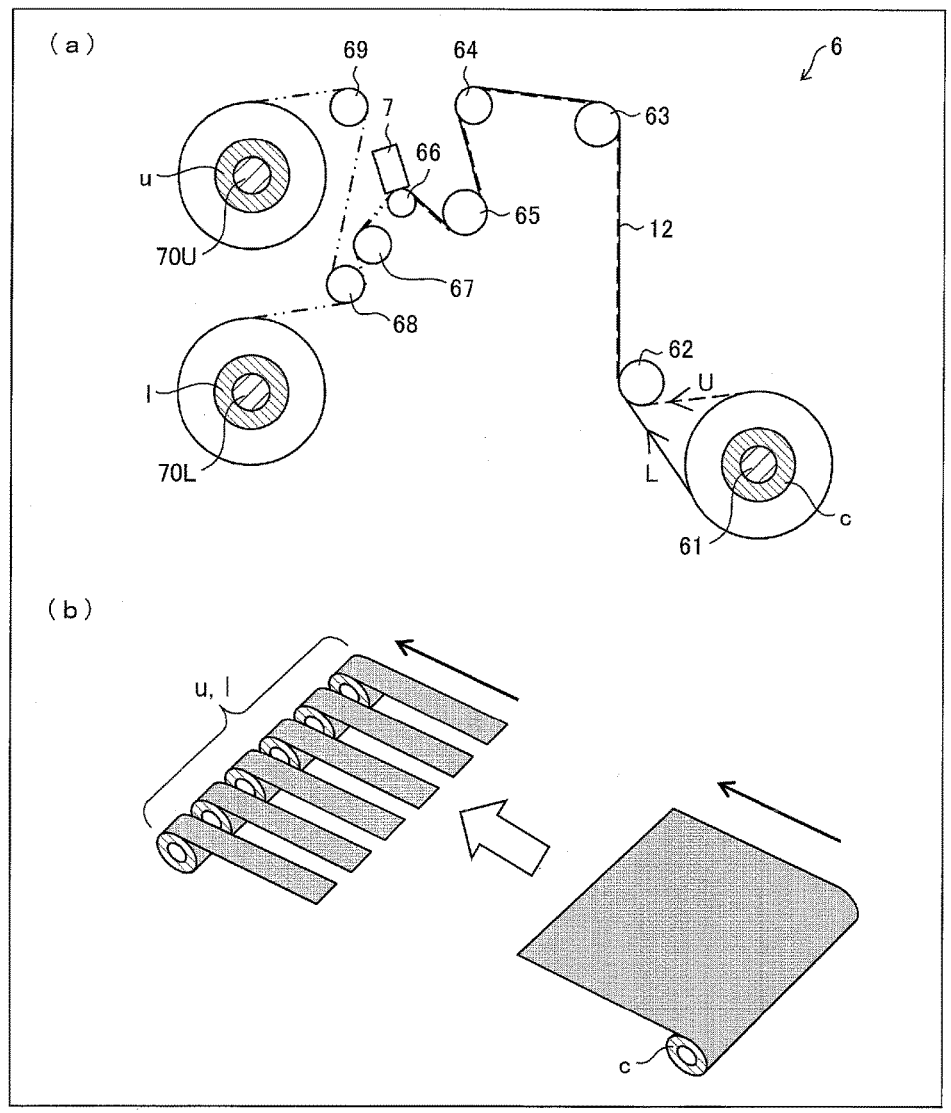
FIG. 4 is a schematic view illustrating a configuration of a slitting apparatus for slitting the separator.

FIG. 4 is a schematic view illustrating a configuration of a slitting apparatus 6 for slitting the separator. (a) of FIG. 4 illustrates an entire configuration, and (b) of FIG. 4 illustrates arrangements before and after slitting the original sheet. As illustrated in (a) of FIG. 4, the slitting apparatus 6 includes a rotatably-supported cylindrical wind-off roller 61, rollers 62 through 69, and take-up rollers 70U and 70L. The slitting apparatus 6 further includes cutting devices 7 described later.

(Before Slitting)

In the slitting apparatus 6, a cylindrical core c around which the original sheet is wrapped is fit on the wind-off roller 61. As illustrated in (b) of FIG. 4, the original sheet is wound off from the core c to a route U or L. The original sheet which has been thus wound off is transferred to the roller 68, via the rollers 63 through 67. In the transferring step, the original sheet is slit into a plurality of slit separators. Note that the roller 67 is not necessarily provided. In such a case, the original sheet is transferred from the roller 66 to the roller 68.

(After Slitting)

As illustrated in (b) of FIG. 4, some of the plurality of slit separators are wound around respective cylindrical cores u (bobbins), which are fit on the take-up roller 70U. Meanwhile, the others of the plurality of slit separators are wound around respective cylindrical cores l (bobbins), which are fit on the take-up roller 70L. Note that (i) the slit separators each wound around in a roll manner and (ii) the respective cores u and l are, as a whole, referred to as a "roll".

(Cutting Device)

Figure 5:
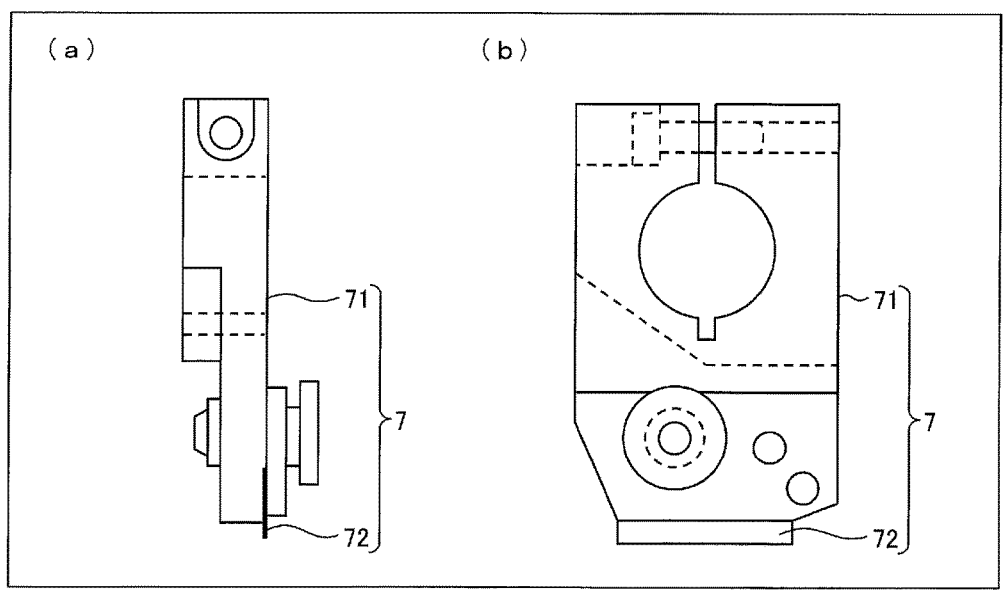
FIG. 5 is a view illustrating a configuration of each of cutting devices in the slitting apparatus illustrated in FIG. 4.

FIG. 5 is a view illustrating a configuration of each of the cutting devices 7 in the slitting apparatus 6 as illustrated in (a) of FIG. 4. (a) of FIG. 5 is a side view of the cutting device 7, and (b) of FIG. 5 is a front view of the cutting device 7. As illustrated in (a) and (b) of FIG. 5, each of the cutting devices 7 includes a holder 71 and a blade 72. The holder 71 is fixed to a housing or the like provided in the slitting apparatus 6. The holder 71 holds the blade 72 such that the blade 72 and an original sheet of the separator being transferred have a fixed positional relation. The blade 72 (i) has a finely sharpened edge and (ii) slits the original sheet of the separator by using the edge.

[Embodiments]

The following description will sequentially discuss a separator roll to be assembled in an embodiment of the present invention, and a buffering material, a core member, and a protector which are also assembled together.

<Configuration of Separator Roll>

Figure 6:
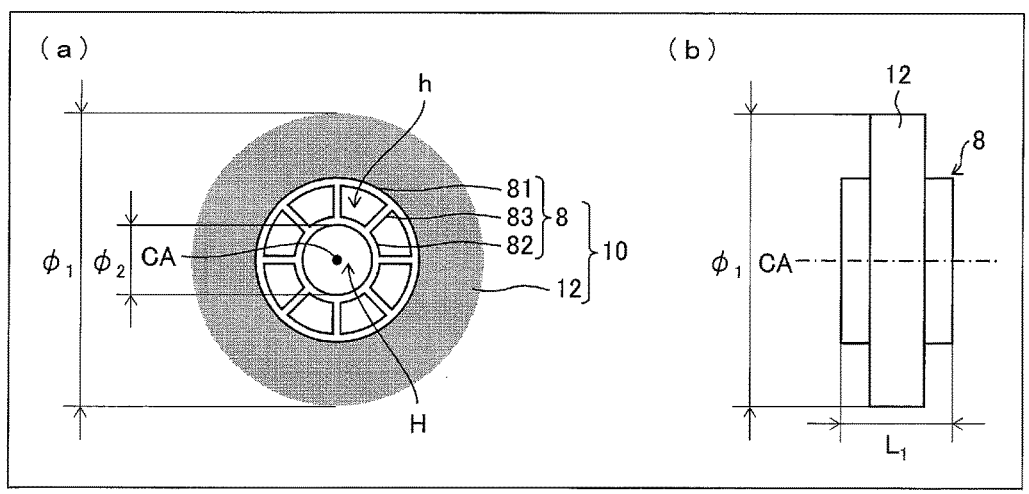
FIG. 6 is a schematic view illustrating a configuration of a separator roll in accordance with an embodiment of the present invention.

FIG. 6 illustrates a configuration of a separator roll 10 which is to be assembled in accordance with an embodiment of the present invention. (a) of FIG. 6 is a front view illustrating a state in which the separator 12 has not been wound off from the core 8 yet. (b) of FIG. 6 is a side view of (a) of FIG. 6. As illustrated in (a) and (b) of FIG. 6, the separator roll 10 includes the core 8 around which the separator 12 is wound. Note that the separator 12 is not an original sheet but is a slit separator obtained by slitting the original sheet as above described.

(Core)

The core 8 includes an outer cylinder part 81, an inner cylinder part 82, and ribs 83 (support members), and has the same function as that of the cores u and l. The core 8 has a shaft hole H whose center is a central axis CA of the core 8.

The outer cylinder part 81 is a cylindrical member having an outer peripheral surface around which the separator 12 is wound. The inner cylinder part 82 is a cylindrical member which is provided inside the outer cylinder part 81 so as to surround the shaft hole H. The ribs 83 are eight support members which are provided, at intervals, between the outer cylinder part 81 and the inner cylinder part 82 so as to support them. The core 8 has through holes h each surrounded by the outer cylinder part 81, the inner cylinder part 82, and the ribs 83.

Materials of the core 8 include an ABS resin. Note, however, that the materials of the core used in the embodiment of the present invention are not limited to the ABS resin hut can alternatively include resins such as a polyethylene resin, a polypropylene resin, a polystyrene resin, and a vinyl chloride resin. It is preferable that the materials of the core do not include metal, paper, and a fluorine resin. In the separator roll 10 in which the separator 12 is wound around the core 8, a stress is applied due to winding of the separator 12. In order to inhibit deformation of the core 8 by the stress due to winding, the core 8 preferably has rigidity. The materials of the core in accordance with the embodiment of the present invention are not limited to the above exemplified ones and can be any of materials, provided that the materials have rigidity.

A length of the core 8 in a direction along the central axis CA of the core 8 is defined as a width $L_1$, an outer peripheral diameter of the outer cylinder part 81 in a plane perpendicular to the central axis CA of the core 8 is defined as an outer diameter of the core 8, and an inner peripheral diameter (diameter of the shaft hole H) of the inner cylinder part 82 in the plane perpendicular to the central axis CA of the core 8 is defined as an inner diameter $\varphi_2$ of the core 8. The width $L_1$, the outer diameter, and the inner diameter $\varphi_2$ of the core are not particularly limited. Moreover, the width $L_1$ of the core 8 included in the separator roll 10 is defined as a width of the separator roll 10.

(Separator)

An outer peripheral diameter of the separator 12, which is being wound, in the plane perpendicular to a central axis CA of the separator roll 10 is defined as an outer diameter $\varphi_1$ of the separator roll 10. The outer diameter $\varphi_1$ of the separator roll 10 depends on the outer diameter of the core 8 and a length of the separator 12 and is not particularly limited.

<Configuration of Buffering Material>

The plate member in accordance with an aspect of the present invention can be a buffering material.

Figure 7:
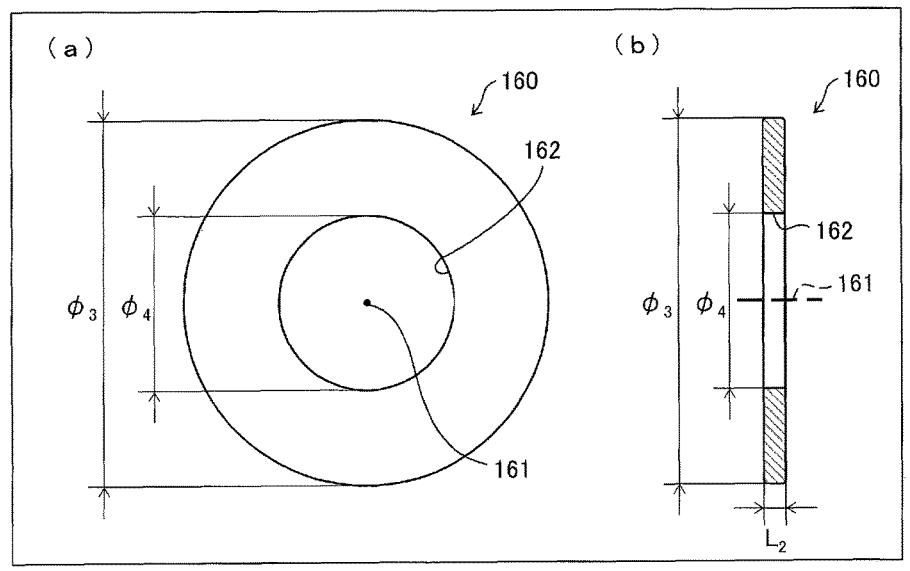
FIG. 7 is a schematic view illustrating a configuration of a buffering material in accordance with an embodiment of the present invention.

FIG. 7 is a schematic view illustrating a configuration of a buffering material (plate member) 160 in accordance with the embodiment of the present invention. (a) of FIG. 7 is a front view, and (b) of FIG. 7 is a side view of (a) of FIG. 7.

The buffering material 160 is flexible, is more likely to be deformed by external force, and has a self-supporting property. For example, the buffering material 160 is a porous body (such as urethane foam) which is made of a sponge-like resin. The buffering material 160 has, for example, a flat annular shape and has a shaft hole 162 whose center is a central axis 161 of the buffering material 160. A length in a direction along the central axis 161 of the buffering material 160 is defined as a thickness $L_2$ of the buffering material 160, an outer peripheral diameter in a plane perpendicular to the central axis 161 of the buffering material 160 is defined as an outer diameter $\varphi_3$ of the buffering material 160, and an inner peripheral diameter (diameter of the shaft hole 162) in the plane perpendicular to the central axis 161 of the buffering material is defined as an inner diameter $\varphi_4$ of the buffering material 160. The thickness $L_2$, the outer diameter $\varphi_3$, and the inner diameter $\varphi_4$ of the buffering material 160 are not particularly limited. In the present embodiment, for simplification, the buffering material 160 has the flat annular shape. Note, however, that the shape of the buffering material in accordance with an aspect of the present invention is not limited to this. The buffering material can have a shape in which a surface has undulations or has concavity and convexity. One of or both of an inner peripheral shape and an outer peripheral shape of the buffering material can have a shape other than the circular shape. A center of an inner periphery of the buffering material can be different from a center of an outer periphery of the buffering material.

The buffering material 160 is flexible and, when the roll assembly is changed in posture or is transported, the buffering material 160 absorbs vibration and impact of collision of the separator roll 10 which has been assembled together. Thus, the buffering material 160 can protect the separator 12, which has been wound into the separator roll 10, from vibration and collision.

Note that the above dimensions (i.e., the thickness $L_2$, the outer diameter $\varphi_3$, and the inner diameter $\varphi_4$ of the buffering material 160) are dimensions in a state where the buffering material 160 is not deformed by external force. Specifically, the dimensions are measured in a state where the buffering material 160 is flatly placed on a flat horizontal plane such that the central axis 161 extends in parallel with a direction of gravity. In this specification, unless otherwise noted, dimensions of each constituent member are dimensions in a state where the each constituent member is not deformed by external force.

In order to protect the lateral surface of the separator roll 10, the thickness $L_2$ of the buffering material 160 is preferably a thickness which is large enough to absorb vibration in transportation. In order to protect the lateral surface of the separator roll 10, the thickness $L_2$ of the buffering material 160 is preferably a thickness which is large enough to absorb impact of collision by vibration.

In order to protect the entire lateral surface of the separator roll 10, the outer diameter $\varphi_3$ of the buffering material 160 is preferably larger than the outer diameter $\varphi_1$ of the separator roll 10. The inner diameter $\varphi_4$ of the buffering material 160 is preferably slightly larger than the outer diameter $\varphi_5$ of a core member 150 (later described) so that the core member 150 can be easily passed through the buffering material 160.

<Core Member>

Figure 8:
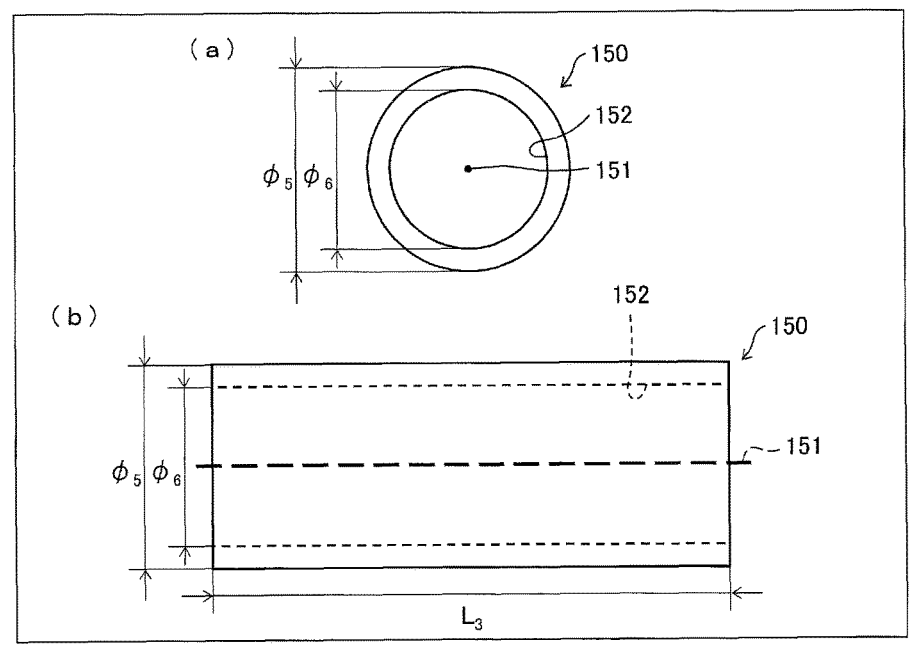
FIG. 8 is a schematic view illustrating a configuration of a core member in accordance with an embodiment of the present invention.

FIG. 8 is a schematic view illustrating a configuration of the core member 150 in accordance with the embodiment of the present invention. (a) of FIG. 8 is a front view, and (b) of FIG. 8 is a side view of (a) of FIG. 8.

A material of the core member 150 only needs to be a material with which weighting by an object through which the core member is passed (i.e., a total weight of the separator rolls 10 and the buffering materials 160 through which the core member 150 is passed) can be supported. The material of the core member 150 is, for example and not limited to, a hard resin. The weighting is, for example, a total weight of four separator rolls 10 and five buffering materials 160. The material of the core member 150 can encompass resins such as an ABS resin, a polyethylene resin, a polypropylene resin, a polystyrene resin, and a vinyl chloride resin, or can be paper.

The core member 150 is a pipe having a cylindrical shape, and has a shaft hole 152 whose center is a central axis 151 of the core member 150. It is assumed that a length in a direction along the central axis 151 of the core member 150 is a length $L_3$ of the core member 150, an outer peripheral diameter in a plane perpendicular to the central axis 151 of the core member 150 is an outer diameter $\varphi_5$ of the core member 150, and an inner peripheral diameter (diameter of shaft hole 152) in a plane perpendicular to a central axis 151 of the core member is an inner diameter $\varphi_6$ of the core member 150. The thickness $L_3$, the outer diameter $\varphi_5$, and the inner diameter $\varphi_6$ of the core member 150 are not limited to particular ones. In the present embodiment, for simplification, the core member 150 has the cylindrical shape. Note, however, that a shape of the core member in accordance with an aspect of the present invention is not limited to this. The shape of the core member can be an angular tube shape, and an inner peripheral shape of the core member can be different from an outer peripheral shape of the core member. The outer peripheral shape of the core member preferably corresponds to the inner peripheral shape (i.e., a shape of the shaft hole) of the inner cylinder part of the core used in the embodiment of the present invention.

The length $L_3$ of the core member 150 only needs to be a length in which ends of the core member 150 do not protrude from an intended number of separator rolls 10 and an intended number of buffering materials 160 through which the core member 150 is passed. In other words, the length $L_3$ of the core member 150 only needs to be shorter than a sum of a total of widths $L_1$ of the separator rolls 10 and a total of thicknesses $L_2$ of the buffering materials 160 through which the core member 150 is passed. For example, in a case where the core member 150 is passed through four separator rolls 10 and five buffering materials 160 alternately, the following holds true: $L_3 < 4L_1 + 5L_2$.

The core member 150 is passed through the separator roll 10 so as to penetrate the shaft hole H. Moreover, the core member 150 is passed through the buffering material 160 so as to penetrate the shaft hole 162. Therefore, the outer diameter $\varphi_5$ of the core member 150 only needs to be smaller than the diameter $\varphi_2$ of the shaft hole H and the diameter $\varphi_4$ of the shaft hole 162. Conversely, the shaft hole H can be provided in the core 8 such that the diameter $\varphi_2$ becomes larger than the outer diameter $\varphi_5$ of the core member 150, and the shaft hole 162 can be provided in the buffering material 160 such that the diameter $\varphi_4$ becomes larger than the outer diameter $\varphi_5$ of the core member 150. Moreover, the outer diameter $\varphi_5$ of the core member 150 is preferably close to the inner diameter $\varphi_2$ of the core 8 so that the separator roll 10 through which the core member 150 is passed is stabilized.

The inner diameter $\varphi_6$ of the core member 150 can be small, provided that the core member 150 can support weighting of an object through which the core member 150 is passed. In order to reduce a weight, the core member 150 may be shaped thinner or may be provided with a lightening hole.

The shaft hole 152 of the core member 150 makes contact with a protruding section 142 of a protector 140 which will be described later. Therefore, a wall surface of the shaft hole 152 is smoothly formed so that abrasion dust is hardly generated even in a case where the shaft hole 152 and the protruding section 142 rub against each other.

<Protector>

A first lateral plate and a second lateral plate in accordance with an aspect of the present invention can be protectors for protecting the separator roll.

Figure 9:
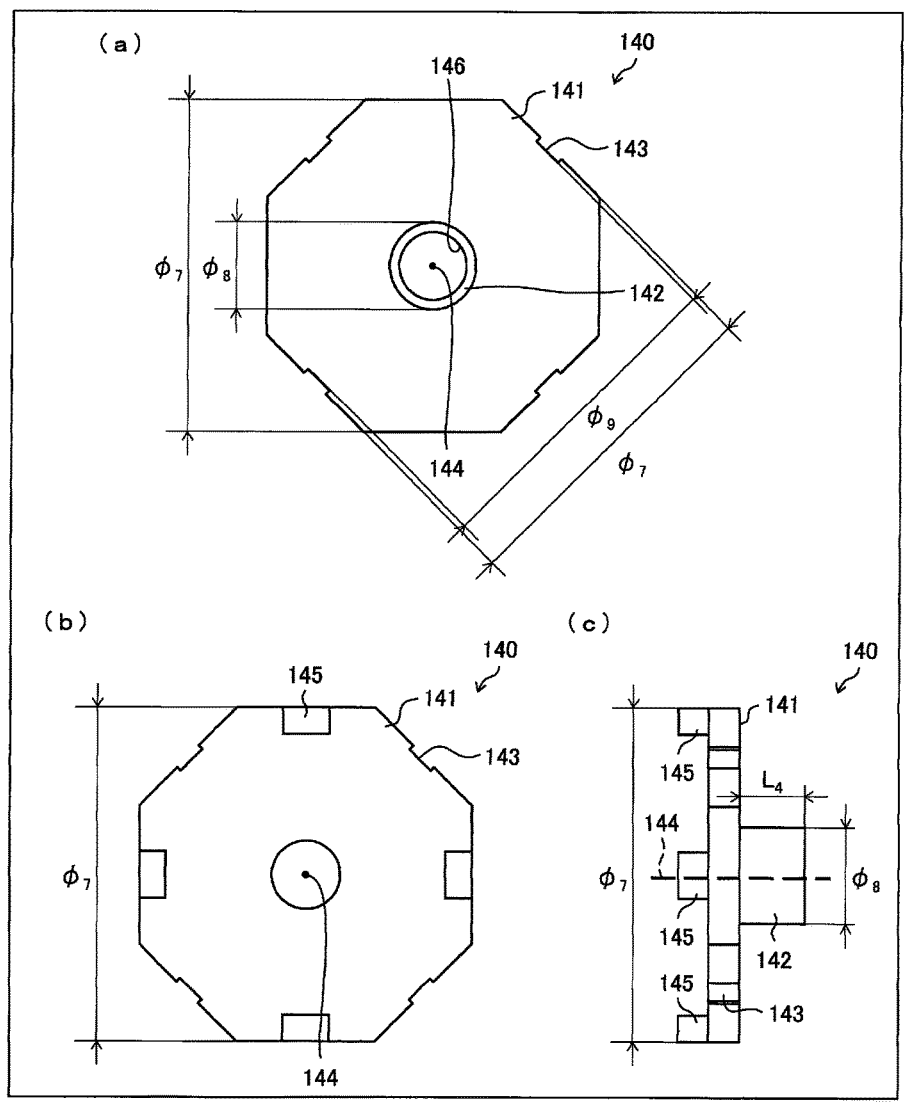
FIG. 9 is a schematic view illustrating a configuration of a protector in accordance with an embodiment of the present invention.

FIG. 9 is a schematic view illustrating a protector (first lateral plate, second lateral plate) 140 in accordance with the embodiment of the present invention. (a) of FIG. 9 is a front view, (b) of FIG. 9 is a rear view of (a) of FIG. 9, and (c) of FIG. 9 is a side view of (a) of FIG. 9.

A material of the protector 140 only needs to be a material with which two protectors 140 can suspend the core member 150 which supports the weighting (i.e., the total weight of the separator rolls 10 and the buffering materials 160 through which the core member 150 is passed). The material of the protector 140 can be, for example, a hard resin. The material of the protector 140 can encompass resins such as an ABS resin, a polyethylene resin, a polypropylene resin, a polystyrene resin, and a vinyl chloride resin, or can be paper.

The protector 140 includes (i) a protruding section (first protruding section, second protruding section) 142 that is provided on an inner surface of a base section (first base section, second base section) 141, (ii) a plurality of leg sections 145 which are provided on an outer surface of the base section 141, (iii) a plurality of notch grooves (first engaging section, second engaging section) 143 which are provided in an outer peripheral part of the base section 141, and (iv) a shaft hole 146 whose center is a central axis 144 of the base section 141.

(Base Section)

The base section 141 is a plate-like member having a substantially octagonal shape. The base section 141 has (i) the inner surface which is a main surface closer to the separator roll 10 when the protector 140 is provided on the core member 150 and (ii) the outer surface which is a main surface away from the separator roll 10 when the protector 140 is provided on the core member 150. A distance between opposite sides of the base section 141 in a plane perpendicular to the central axis 144 is defined as an external dimension $\varphi_7$ of the base section 141.

The shape of the base section 141 is not limited to this and can be a curved shape, an asymmetrical shape, or another substantially regular polygonal shape such as a substantially quadrangular shape or a substantially hexagonal shape.

A thickness of the base section 141 only needs to be enough to suspend the core member 150 which supports the above described weighting. In order to reduce a weight, the base section 141 may be shaped thinner or may be provided with a lightening hole.

The external dimension $\varphi_7$ of the base section 141 is preferably larger than the outer diameter $\varphi_1$ of the separator roll 10 so that the core member 150 passing through the separator roll 10 can suspend while preventing the separator 12 from contacting with ground. Moreover, the external dimension $\varphi_7$ of the base section 141 is preferably larger than the outer diameter $\varphi_1$ of the separator roll 10 and the outer diameter $\varphi_3$ of the buffering material 160 so that the core member 150 passing through the separator roll 10 and the buffering material 160 can be suspended while preventing the separator 12 and the buffering material 160 from contacting with ground.

(Protruding Section)

The protruding section 142 has a center which is the central axis 144 of the base section 141 and protrudes from the inner surface of the base section 141. A length of the protruding section 142 from the inner surface of the base section 141 in a direction along the central axis 144 is defined as a height $L_4$ ($L_5$) of the protruding section 142, and an outer peripheral diameter of the protruding section 142 in a plane perpendicular to the central axis 144 is defined as an outer diameter $\varphi_8$ of the protruding section 142.

The height $L_4$ of the protruding section 142 is set so that the protruding section 142 can be inserted into the shaft hole 152 of the core member 150 even in a case where the core member 150 passing through an intended number of separator rolls 10 and an intended number of buffering materials 160 is being shifted to one side. Therefore, the height $L_4$ of the protruding section 142 only needs to be greater than a value obtained by subtracting the length $L_3$ of the core member 150 from a sum of a total of widths $L_1$ of the separator rolls 10 and a total of thicknesses $L_2$ of the buffering materials 160 through which the core member 150 is passed. In other words, it is enough that a sum of the length $L_3$ of the core member 150 and the height $L_4$ of the protruding section 142 is greater than the s.um of the total of widths $L_1$ of the separator rolls 10 and the total of thicknesses $L_2$ of the buffering materials 160 through which the core member 150 is passed. For example, in a case where the core member 150 is passed through four separator rolls 10 and five buffering materials 160 alternately, the following holds true: $L_3 + L_4 < 4L_1 + 5L_2$.

The height $L_4$ of the protruding section 142 of course needs to be smaller than the length $L_3$ of the core member 150 so that, when a protruding section 142 is inserted into one end of the core member 150, another protruding section 142 of another protector 140 can be inserted into the other end (opposite to the one end) of the core member 150 so as to set the protectors 140 to both ends of the core member 150. Moreover, $2L_4<4L_1+5L_2$ needs to hold true so that the inner surfaces of the protectors 140 can hold the buffering materials 160 and the separator rolls 10 through which the core member 150 is passed. Note that, in a case where the protector 140 is set to only one end of the core member 150, $L_4<4L_1+5L_2$ can hold true because it is only necessary that the protector 140 does not protrude from the buffering materials 160 and the separator rolls 10 through which the core member 150 is passed.

The outer diameter $\varphi_8$ of the protruding section 142 is determined so that the protruding section 142 can be engaged with the core member 150. Therefore, the outer diameter $\varphi_8$ of the protruding section 142 only needs to be not greater than the inner diameter $\varphi_6$ of the core member 150. Note that the outer diameter $\varphi_8$ of the protruding section 142 is preferably close to the inner diameter $\varphi_6$ of the core member 150 so that resistance force is generated between the protruding section 142 of the protector 140 and the shaft hole 152 of the core member 150.

In the present embodiment, the protruding section 142 and the base section 141 are integrally formed by a resin. Note, however, that the present embodiment is not limited to this, and the protruding section 142 can be formed separately from the base section 141 and then the protruding section 142 and the base section 141 can be assembled together. Moreover, in the present embodiment, the protruding section 142 is one constituent element having a cylindrical shape. Note, however, that the protruding section 142 can be configured by a plurality of constituent elements. In the present embodiment, for simplification, the protruding section 142 has the cylindrical shape but the shape of the protruding section of the protector in accordance with an aspect of the present invention is not limited to this. The shape of the protruding section only needs to be a shape in which the protruding section can be inserted into the shaft hole of the core member, and the shape of the protruding section preferably corresponds to the shape of the shaft hole of the core member.

As early described, the protruding section 142 makes contact with the shaft hole 152 of the core member 150. Therefore, the lateral surface of the protruding section 142 is smoothly formed so that abrasion dust is hardly generated even in a case where the protruding section 142 and the shaft hole 152 rub against each other.

(Leg Section)

The plurality of leg sections 145 are provided in the outer peripheral part of the outer surface of the base section 141. In the present embodiment, the leg sections 145 are provided every other one of middle parts of respective eight sides of the base section 141 having the substantially octagonal shape. The arrangement of the leg sections 145 is not limited to this, and the leg sections 145 can be provided at respective eight corners of the base section 141 having the substantially octagonal shape or can be arranged in another manner. In the present embodiment, the leg sections 145 and the base section 141 are integrally formed by a resin. Note, however, that the present embodiment is not limited to this, and the leg sections 145 can be formed separately from the base section 141 and then the leg sections 145 and the base section 141 can be assembled together.

(Notch Groove)

The notch grooves 143 serve as engaging sections for engaging the protectors 140 with a binding band which is used to bind the protectors 140 provided at both ends of the core member 150. The binding band is caught by the notch grooves 143 and thus the protectors 140 are engaged with the binding band. Further, the binding band is hardly loosened after the binding.

A distance between groove bottoms of notch grooves 143 which are respectively provided on opposite sides of the base section 141 having the substantially octagonal shape is defined as a facing distance $\varphi_9$ of the notch grooves 143, and the facing distance $\varphi_9$ of the notch grooves 143 only needs to be greater than the outer diameter $\varphi_1$ of the separator roll 10 so that the provided binding band does not make contact with and is kept off from the separator roll 10.

The notch grooves 143 serve also as guiding sections for guiding the binding band so that the binding band binds the protectors 140 at appropriate positions. By the notch grooves 143, the binding band is guided to the positions appropriate for binding, and therefore the binding band is hardly loosened after the binding.

The plurality of notch grooves 143 are provided in the outer peripheral part of the base section 141. In the present embodiment, the plurality of notch grooves 143 are provided every other one of middle parts of respective eight sides of the base section 141 having the substantially octagonal shape. In this case, the plurality of notch grooves 143 are formed so as to notch the sides of the base section 141 in which sides the leg sections 145 are not provided. The engaging section for engaging the binding band with the protector 140 is not limited to this, and can be an X-shaped groove which is provided in the outer surface of the base section 141 or can be a projecting section or the like.

<Assembling Step>

The following description will sequentially discuss an example of an assembling step in accordance with the embodiment of the present invention. Note that, unless otherwise noted, "up" means a higher part in the direction of gravity, and "down" means a lower part in the direction of gravity in the following descriptions of the assembling step.

Figure 10:
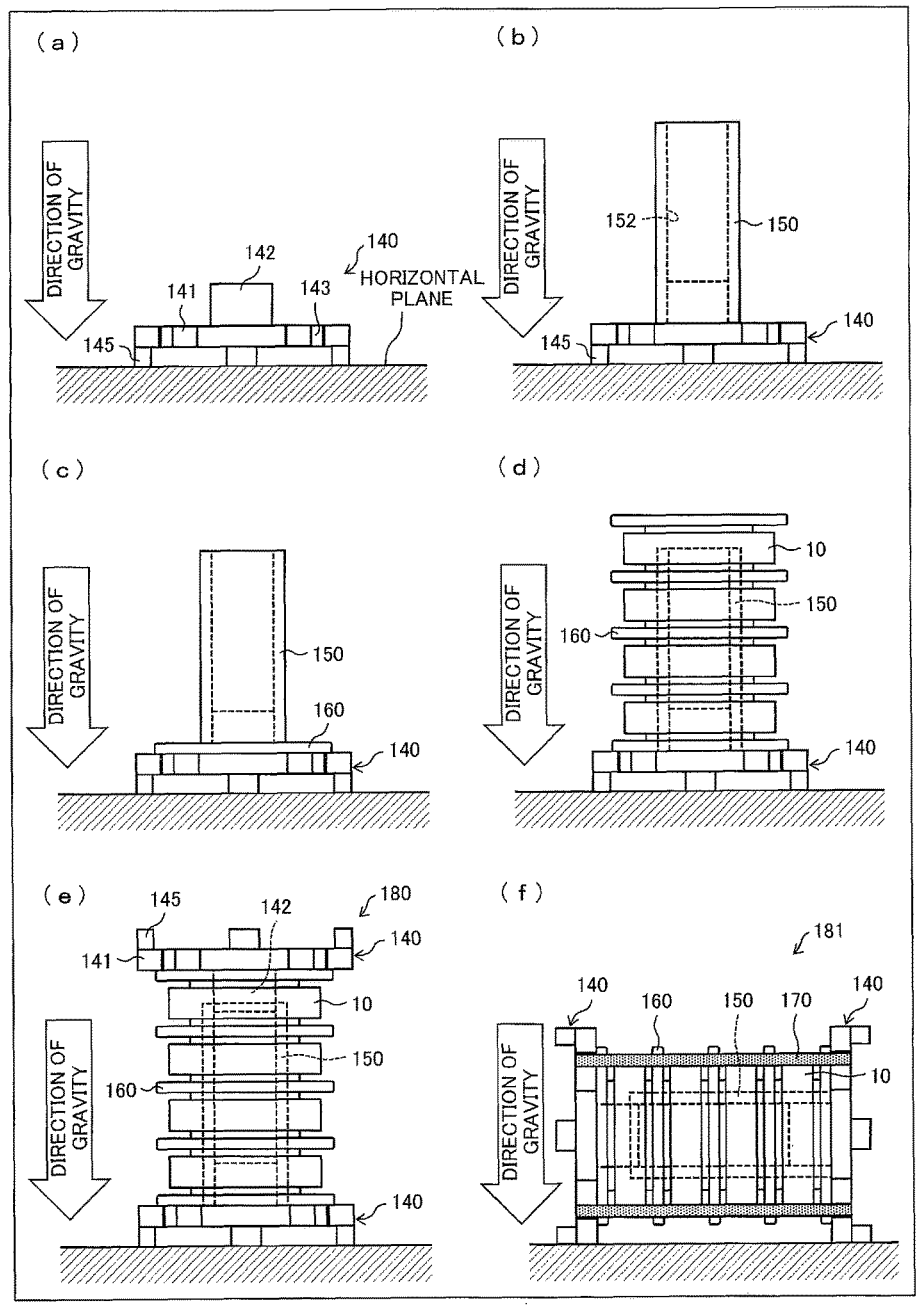
FIG. 10 is a schematic view illustrating an example of steps of assembling a roll assembly in accordance with an embodiment of the present invention.

FIG. 10 is a schematic view illustrating an example of a step of assembling a roll assembly (assembly) 180 in accordance with the embodiment of the present invention.

First, as illustrated in (a) of FIG. 10, the protector 140 is flatly placed on a substantially flat and substantially horizontal plane so that the outer surface faces downward. In this case, the protector 140 stands on the substantially horizontal plane by the leg sections 145 and the protruding section 142 faces upward. Moreover, the central axis 144 (see FIG. 9) of the protector 140 extends in a substantially vertical direction.

Next, as illustrated in (b) of FIG. 10, the protruding section 142 of the protector 140 is inserted into the core member 150 (first inserting step) so that the core member 150 stands while the central axis 151 (see FIG. 8) extends in the substantially vertical direction. Specifically, one end of the core member 150 is caused to face downward, another end (opposite to the one end) of the core member 150 is caused to face upward, the central axis of the core member 150 is caused to substantially conform to the central axis of the protector 140, and the protruding section 142 of the protector 140 is inserted into the shaft hole 152 at the one end of the core member 150. Thus, the one end of the core member 150 is engaged with the protector 140.

In this case, the protruding section 142 is preferably deeply inserted into the shaft hole 152 so that the core member 150 stably stands. Therefore, the inner surface of the base section 141 of the protector 140 makes contact with an end surface of the core member 150 at a lower end (i.e., the one end). Moreover, the central axis 151 (see FIG. 8) of the core member 150 preferably extends in the substantially vertical direction so that the core member 150 stably stands.

Then, as illustrated in (c) of FIG. 10, the core member 150 is passed through the buffering material 160 (passing-through, step). Specifically, the central axis of the buffering material 160 is caused to substantially conform to the central axis of the core member 150 so that the core member 150 passes through the shaft hole in the buffering material 160, and the buffering material 160 is moved from an upper end (the another end) to the lower end (the one end) of the core member 150 along the central axis (passing-through direction). Next, the core member 150 is passed through the separator roll 10 (passing-through step). Specifically, the central axis of the separator roll 10 is caused to substantially conform to the central axis of the core member 150 so that the core member 150 passes through the shaft hole in the separator roll 10, and the separator roll 10 is moved from the upper end to the lower end of the core member 150 along the central axis (passing-through direction). Similarly, as illustrated in (d) of FIG. 10, the core member 150 is alternately passed through three other buffering materials 160 and three other separator rolls 10, and lastly the core member 150 is further passed through another buffering material 160.

In this case, the core member 150 stands in the substantially vertical direction, and therefore the core member 150 can be smoothly passed through the buffering materials 160 and the separator rolls 10 without resistance. Moreover, a center of gravity is constantly substantially on the central axis of the core member 150, and therefore the center of gravity is stable. From this, the core member 150 can be stably passed through the buffering materials 160 and the separator rolls 10. Moreover, since the core member 150 stands in the substantially vertical direction, the gravity allows the buffering materials 160, the cores 8 of the separator rolls 10, and the protector 140 to be easily stacked without a void.

Then, as illustrated in (e) of FIG. 10, another protector 140 is flatly placed on the uppermost buffering material 160 so that the outer surface faces upward, and the protruding section 142 is inserted into the core member 150 (second inserting step). Specifically, the central axis of the protector 140 is caused to substantially conform to the central axis of the core member 150, and the protruding section 142 of the protector 140 is partially inserted into the shaft hole 152 at the upper end of the core member 150 so as to be engaged with the shaft hole 152.

In this case, the total of widths $L_1$ (i.e., $4L_1$) of the cores 8 in the four separator rolls 10, the total of thicknesses $L_2$ (i.e., $5L_2$) of the five buffering materials 160, the length $L_3$ of the core member 150 passing through the four separator rolls 10 and the five buffering materials 160, and the height $L_4$ of the protruding section 142 of the protector 140 to be inserted satisfy the following inequality relation of (Formula 1).

$$L_4 > 4L_1 + 5L_2 - L_3 (>0) \quad \text{(Formula 1)}$$

From this, at least a part of the protruding section 142 can be surely inserted into the shaft hole 152.

In this case, the end surface of the core member 150 at the upper end does preferably not protrude higher than the uppermost buffering material 160. In other words, it is preferable that the protruding section 142 is inserted into the shaft hole 152 such that a distance between the inner surface of the protector 140 on the lower side and the inner surface of the protector 140 on the upper side becomes not less than the length $L_3$ of the core member 150. More preferably, the distance between the inner surface of the protector 140 on the lower side and the inner surface of the protector 140 on the upper side becomes greater than the length $L_3$ of the core member 150. Weights of the buffering materials 160 and the separator rolls 10 which are stacked, a weight of the protector 140 which is inserted into the core member 150 at the upper end, and a pressure for inserting the protector 140 into the core member 150 at the upper end is applied to the buffering materials 160 as external force. Therefore, it is only necessary that the following relation of (Formula 2) is satisfied in a state where the buffering materials 160 are deformed by the external force.

$$4L_1 + L_{2,sum,deformed} \geq L_3 \quad \text{(Formula 2)}$$

Note that $L_{2,sum,deformed}$ is a total of thicknesses (length along the central axis 161) of inner peripheral parts (in the vicinity of the shaft hole 162, a part sandwiched between the cores 8 or between the core 8 and the protector 140) of the buffering materials 160 which are being deformed.

The number of separator rolls 10 through which the core member 150 is passed is not limited to four, and the number of buffering materials 160 through which the core member 150 is passed is not limited to five. In a case where the number of separator rolls 10 through which the core member 150 is passed is assumed to be m (m: natural number) and the number of buffering materials 160 through which the core member 150 is passed is assumed to be n (n: natural number), it is only necessary that an inequality relation of (Formula 3) below is satisfied. Further, it is preferable that a relation of n=m+1 holds true, that is, it is preferable that buffering materials are provided at respective positions between the protector 140 and the separator roll 10 and between the separator rolls 10.

$$L_4 > mL_1 + nL_2 - L_3 (>0) \quad \text{(Formula 3)}$$

Therefore, the length $L_3$ of the core member 150 and the height $L_4$ of the protruding section 142 can be determined by taking into consideration the number m of the separator rolls 10 through which the core member 150 is passed, widths $L_1$ of cores of the separator rolls 10 through which the core member 150 is passed, and the number n and the thicknesses $L_2$ of the buffering materials 160 through which the core member 150 is passed.

By thus assembling the two protectors 140, the one core member 150, and the five buffering materials 160, the roll assembly 180 is formed.

Then, a posture of the roll assembly 180 is changed from a standing posture in which the central axis of the core member 150 extends in the vertical direction to a lying posture in which the central axis of the core member 150 extends in the horizontal direction. Specifically, the direction of the roll assembly is changed such that the central axis of the core member 150 extends in the horizontal direction while preventing the two protectors 140 from falling off from the core member 150.

In the roll assembly 180 which is in the lying posture, the base sections 141 of both the protectors 140 can be kept off from the end surfaces of the core member 150 without contact. In the standing posture, the buffering materials 160 are squashed by loads of the separator rolls 10 and the protector 140 which are provided above them. Meanwhile, in the lying posture, no load is externally applied to the buffering materials 160. Therefore, in a case where the roll assembly 180 is caused to lie down, the thicknesses of the buffering materials 160 are restored. Moreover, the protector 140 which has been on the lower side is slightly moved by being pressed by the buffering materials 160 thus restored, and therefore the base section 141 which has been contacting with the end surface of the core member 150 at the one end can be moved off from the end surface of the core member 150 at the one end.

Moreover, in the lying posture, only the outer peripheral parts of the protectors 140 are contacting with ground, and the core member 150 is suspended by the protectors 140 on the both sides. With the arrangement, the buffering materials 160 and the separator rolls 10 are supported so as to be up in the air by the core member 150 which is passing through the buffering materials 160 and the separator rolls 10.

Then, as illustrated in (f) of FIG. 10, the protectors 140 are bound with one (1) binding band (band member) 170 in an X-shaped manner (binding step). By thus binding the protectors 140 on both sides with the binding band 170, the roll assembly 180 is tied up.

In this case, the roll assembly 180 is preferably tied up such that a distance between the inner surfaces of the protectors 140 on both sides becomes not less than the length $L_3$ of the core member 150. Further, the roll assembly 180 is more preferably tied up such that a distance between the inner surfaces of the protectors 140 on both sides becomes greater than the length $L_3$ of the core member 150. A tension of the binding band 170 conveyed via the protectors 140 is applied to the buffering materials 160 as external force. Therefore, it is only necessary that the relation of (Formula 2) is satisfied in a state where the buffering materials 160 are deformed by the external force.

$$4L_1+L_{2,sum,deformed} \geq L_3 \quad \text{(Formula 2)}$$

Note that, as with the case of inserting the protector 140 into the core member 150 at the upper end, $L_{2,sum,deformed}$ is a total of thicknesses of the inner peripheral parts of the buffering materials 160 which are being deformed.

Moreover, the binding band 170 is engaged with the notch grooves 143 of the protectors 140 so that the binding band 170 does not come off from the roll assembly 180. Moreover, the roll assembly 180 is tied up with the binding band 170 such that no void is generated between the separator roll 10 and the buffering material 160 or between the protector 140 and the buffering material 160. In other words, the roll assembly 180 is tightly tied up with the binding band 170 such that the distance between the inner surfaces of the protectors 140 on both sides becomes not greater than a sum of the total ($4L_1$) of widths of the cores 8 of the separator rolls 10 through which the core member 150 is passed and a total ($5L_2$) of thicknesses of the buffering materials 160 through which the core member 150 is passed.

A roll assembly 181 obtained by tying the roll assembly 180 up with the binding band 170 is hardly disassembled and is stable. The distance between the two protectors 140 is restricted by the binding, and therefore the protectors 140 do not fall off from the core member 150. Moreover, a void is hardly generated between the protector 140 and the buffering material 160 and between the core 8 of the separator roll 10 and the buffering material 160. Therefore, the separator rolls 10 almost cannot move with respect to each other, and accordingly the separator rolls 10 hardly collide with each other. Moreover, the separator rolls 10 almost cannot move with respect to the protectors 140, and accordingly the separator rolls 10 hardly collide with the protectors 140. Moreover, the roll assembly 181 can be easily disassembled by cutting the binding band 170 so that the separator rolls 10 can be used.

In the present embodiment, the binding band 170 is a PP band made of a polypropylene (PP) resin, and the PP band is tied by thermal adhesion. Alternatively, another binding band can be used and another tying method can be used. Moreover, a way of binding with the binding band 170 is not limited to a particular one.

<Configuration of Roll Assembly>

The following description will discuss a configuration of the roll assembly 180 which has been assembled by the above described assembling step. Note that a configuration of the roll assembly 181 in which the roll assembly 180 is tied up with the binding band 170 is substantially identical with that of the roll assembly 180 except for the binding band 170, and the binding with a binding band is a known technique. Therefore, the configuration of the roll assembly 181 will not be described.

(Axis Direction)

Figure 11:
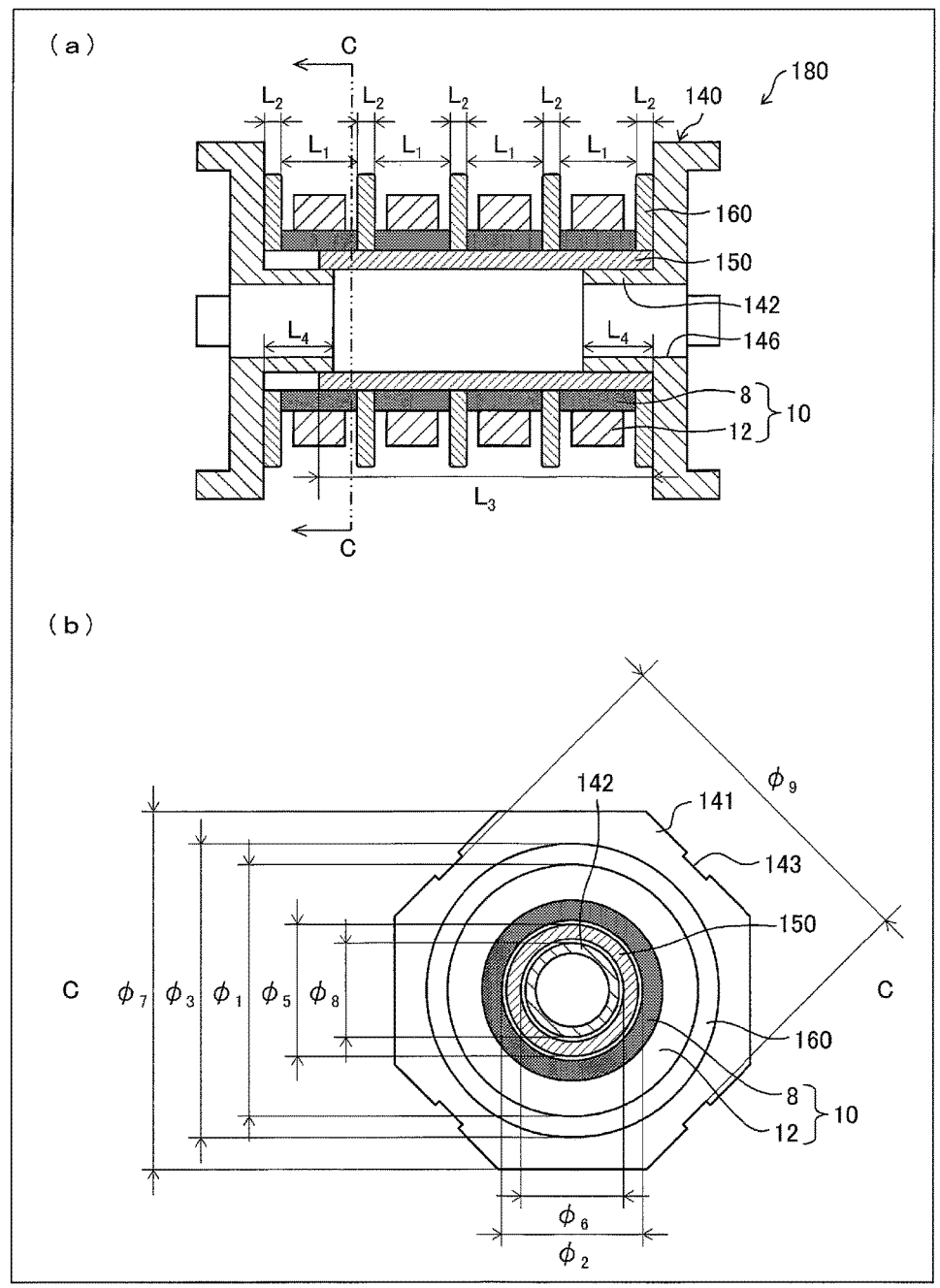
FIG. 11 is a schematic view illustrating a cross sectional configuration of a roll assembly in accordance with an embodiment of the present invention.

FIG. 11 is a schematic view illustrating a cross sectional configuration of the roll assembly 180 in accordance with an embodiment of the present invention. (a) of FIG. 11 is a longitudinal cross-sectional view, and (b) of FIG. 11 is a transverse cross-sectional view.

(a) of FIG. 11 illustrates a longitudinal cross section which is taken by a plane lying on and along the central axis of the core member 150.

Note that, in the roll assembly 180, the central axis of the core member 150 substantially conforms to the central axis of the separator roll 10 and the core 8, the central axis of the buffering material 160, and the central axis 144 of the protector 140.

The protruding section 142 of the protector 140 is inserted into the shaft hole 152 of the core member 150 so that the inequality relation of (Formula 1) is satisfied. With the configuration, even in a case where the core member 150 is shaken by vibration in transportation or the like, the protruding sections 142 of the protectors 140 on both sides remain being inserted in the shaft hole 152 of the core member 150. Therefore, the core member 150 will not fall off from the protectors 140.

$$L_4 > 4L_1 + 5L_2 - L_3 (>0) \quad \text{(Formula 1)}$$

$$L_4 > mL_1 + nL_2 - L_3 (>0) \quad \text{(Formula 3)}$$

When described in a broader manner, the core member 150 does not fall off from the protectors 140, provided that the inequality relation of (Formula 3) is satisfied, where m is the number of the separator rolls 10 through which the core member 150 is passed, and n is the number of the buffering materials 160 through which the core member 150 is passed. Further, it is preferable that a relation of n=m+1 holds true, that is, it is preferable that buffering materials are provided at respective positions between the protector 140 and the separator roll 10 and between the separator rolls 10. Moreover, a relation of $2L_4 < mL_1 + nL_2$ of course needs to hold true so that the inner surfaces of the protectors 140 can hold the buffering materials 160 and the separator rolls 10 through which the core member 150 is passed.

In a case where the outer diameter $\varphi_8$ of the protruding section 142 is close to the inner diameter $\varphi_6$ of the core member 150, resistance force is generated between the protruding section 142 of the protector 140 and the shaft hole 152 of the core member 150 so that relative positions do not change. Due to the resistance force, the core member 150 does not fall off from the protectors 140 unless large force for pulling the protruding section 142 off from the core member 150 is applied. It is therefore easy to change the posture of the roll assembly or to move the roll assembly during the assembling step. Note that the resistance force is weak and therefore, in a case where vibration In transportation or the like is to be applied, the roll assembly 180 is preferably tied up like the roll assembly 181.

(a) of FIG. 11 illustrates an ideal state in which the buffering materials 160 are not compressed. Note, however, that, in the actual roll assembly 180, the buffering materials 160 can be slightly compressed. In a case where the buffering materials 160 are compressed, restorative force for restoring shapes of the buffering materials 160 which are compressed is commensurate with the resistance force which is generated between the core member 150 and the protectors 140 so that the protruding sections 142 of the protectors 140 do not fall off from the shaft hole 152 of the core member 150.

In order to easily understand the inequality relation of (Formula 1), (a) of FIG. 11 illustrates the arrangement in which the end surface of the core member 150 seems to be contacting with one of the protectors 140. Note, however, that, in the actual roll assembly 180, both end surfaces of the core member 150 are substantially off from the protectors 140 as early described.

The buffering materials 160 are provided at positions between the separator roll 10 and the protector 140 and between the separator rolls 10. By the buffering materials 160, vibration of the separator rolls 10 is absorbed, and vibration and impact by the vibration are mitigated. Moreover, even in a case where the separator rolls 10 are slanted, the separators 12 do not directly collide with each other owing to the buffering materials 160, and impact by collision is mitigated. As such, the buffering materials 160 protect the separators 12 which are wound into the respective separator rolls 10.

There is no void between the buffering materials 160, the cores 8 of the separator rolls 10, and the protectors 140. Therefore, the separator rolls 10 almost cannot move between the protectors 140 on both sides. This makes it possible to prevent the separator rolls 10 from colliding with each other or colliding with the protectors 140.

(Diametral Direction)

(b) of FIG. 11 is a cross sectional view taken along the line C-C in (a) of FIG. 11.

As illustrated in (b) of FIG. 11, in order to protect the separators 12 which are wound into the respective separator rolls 10, the external dimension $\varphi_7$ of the base section 141 of the protector 140, the outer diameter $\varphi_3$ of the buffering material 160, and the outer diameter $\varphi_1$ of the separator roll 10 preferably satisfy an inequality relation of (Formula 4) below:

$$\varphi_7 > \varphi_3 > \varphi_1 (>0) \qquad \text{(Formula 4)}$$

Furthermore, in a case where the notch grooves 143 are provided in the outer peripheral part of the protector 140, the facing distance $\varphi_9$ between the notch grooves 143 preferably satisfies an inequality relation of (Formula 5) below:

$$\varphi_7 > \varphi_9 > \varphi_3 > \varphi_1 (>0) \qquad \text{(Formula 5)}$$

As illustrated in (b) of FIG. 11, the outer diameter $\varphi_5$ of the core member 150 and the inner diameter $\varphi_2$ of the core S preferably satisfy a relation of (Formula 6) below so that the core member 150 is passed through the shaft holes of the cores 8 in the separator rolls 10.

$$\varphi_2 > \varphi_5 (>0) \qquad \text{(Formula 6)}$$

The following description will discuss various modification examples of the embodiment of the present invention.

MODIFICATION EXAMPLE 1

The length $L_3$ of the core member 150 is preferably approximate to a sum of the total of widths $L_1$ of the cores 8 in the separator rolls 10 through which the core member 150 is passed and the total of thicknesses $L_2$ of the buffering materials 160 through which the core member 150 is passed while the end surfaces of the core member 150 on both sides are kept off from the base sections 141 of the protectors 140 without contact. In a case where the core member 150 is long enough in this way, the separator rolls 10 through which the core member 150 is passed are more likely to be stable. Note, however, that the core member 150 can be short.

In a case where the core member 150 is short, it is possible to easily assemble the roll assemblies 180 and 181 such that the end surfaces of the core member 150 on both sides are kept off from the base sections 141 of the protectors 140.

$$L_{1,sum} + L_{2,sum,deformed} > L_3 (>0) \qquad \text{(Formula 7)}$$

In other words, a total $L_{1,sum}$ of widths of the cores 8 included in the plurality of separator rolls 10 through which the core member 150 is passed, a total $L_{2,sum,deformed}$ of thicknesses of the inner peripheral parts included in the deformed buffering materials 160 through which the core member 150 is passed, and the length $L_3$ of the core member 150 are more likely to satisfy the above inequality relation of (Formula 7).

The length of the core member 150 is not limited to a particular one and can, for example, satisfy an inequality relation of (Formula 8) below:

$$L_{1,sum} > L_3 (>0) \qquad \text{(Formula 8)}$$

In a case where the inequality relation of (Formula 8) is satisfied, the inequality relation of (Formula 7) is surely satisfied. Specifically, in a case where the core member 150 is passed through four separator rolls 10 in each of which the separator 12 is wound around the core 8 having a width $L_1$ of 70 mm and five buffering materials 160 each of which has a thickness $L_2$ of 1 mm, the length $L_3$ of the core member 150 can be 278 mm which is shorter than 280 mm (4×70 mm).

MODIFICATION EXAMPLE 2

The plate member in accordance with an aspect of the present invention can be a spacer.

Instead of the buffering material 160 or in addition to the buffering material 160, a spacer can be provided between the separator roll 10 and the protector 140 and/or between the separator rolls 10. In a case where the spacer is used together with the buffering material 160, the buffering material 160 can be integrated with the spacer or can be separated from the spacer.

As compared with the buffering material 160, the spacer is less likely to be deformed by external force. By sandwiching the spacer, the separator roll 10 and the protector 140 are kept off from each other, or the separator rolls 10 are kept off from each other. By thus securing a space, for example, even in a case where the separator rolls 10 are slanted with respect to the core member 150 by vibration in transportation of the roll assembly 181, it is possible to prevent the separators 12, which are wound into the respective separator rolls 10, from colliding with the protectors 140 or other separator rolls 10. In particular, in a case where the buffering material 160 and the spacer are used simultaneously, it is possible that the buffering material 160 is provided between the separator roll 10 and the separator roll 10 and the spacer is provided between the protector 140 and the separator roll 10 (at an end of the roll assembly 180). By providing the spacer, which is less likely to be deformed by external force, at the end of the roll assembly 180, and providing the buffering material 160, which is more likely to be deformed by external force, between the separator rolls 10, it is possible to protect the separators 12 which are wound into the respective separator rolls 10 from vibration and collision.

In a case where the spacer is employed also, the core member 150 can of course be short as with in Modification Example 1.

MODIFICATION EXAMPLE 3

The cores 8 of the plurality of separator rolls 10 through which the core member 150 is passed can have different widths. Similarly, in a case where the plurality of buffering materials 160 are used, the plurality of buffering materials 160 through which the core member 150 is passed can have different thicknesses. Further, in a case where a plurality of spacers are used, the plurality of spacers through which the core member 150 is passed can have different thicknesses. In a case where the buffering material 160 and the spacer are used simultaneously, the thickness of the buffering material 160 can be different from the thickness of the spacer.

In this case, it is only necessary that an inequality relation of (Formula 9) below is satisfied, where $L_{1,sum}$ is a total of widths of the cores 8 included in the plurality of separator rolls 10 through which the core member 150 is passed, and $L_{2,sum}$ is a total of thicknesses of the buffering material 160 and the spacer through which the core member 150 is passed.

$$L_4 > mL_1 + nL_2 - L_3 (>0) \qquad \text{(Formula 3)}$$

$$L_4 > L_{1,sum} + L_{2,sum} - L_3 (>0) \qquad \text{(Formula 9)}$$

(Formula 9) is obtained by substituling $mL_1$ and $nL_2$ in (Formula 3) with $L_{1,sum}$ and $L_{2,sum}$, respectively.

In this case also, the core member 150 can of course be short as with in Modification Example 1. Moreover, the relation $2L_4 < L_{1,sum} + L_{2,sum}$ of course needs to hold true such that the inner surfaces of the protectors 140 can hold the buffering materials 160, the separator rolls 10, and the spacers through which the core member 150 is passed.

MODIFICATION EXAMPLE 4

Figure 12:
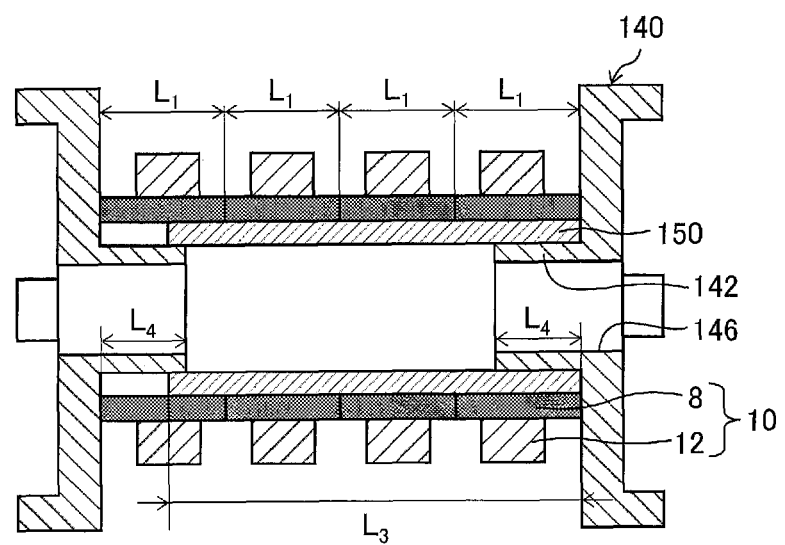
FIG. 12 is a schematic view illustrating a cross sectional configuration of a modification example of a roll assembly in accordance with an embodiment of the present invention.

FIG. 12 is a schematic view illustrating a cross sectional configuration in a modification example of the roll assembly 180 in accordance with the embodiment of the present invention.

In the assembly of the separator rolls 10, the buffering material 160 and the spacer are not essential constituent elements. Therefore, if it is unnecessary to provide the buffering material 160 and the spacer for protecting the separators 12 which are wound into the respective separator rolls 10, the core member 150 can be passed through only the separator rolls 10 without the buffering material 160 and the spacer (see FIG. 12).

In a case where the core member 150 passes through only m-pieces of the separator rolls 10, it is only necessary to satisfy an inequality relation of (Formula 10) below:

$$L_4 > mL_1 + nL_2 - L_3 (>0) \qquad \text{(Formula 3)}$$

$$L_4 > mL_1 - L_3 (>0) \qquad \text{(Formula 10)}$$

(Formula 10) is obtained by setting "n" in (Formula 3) to zero.

In this case also, the cores 8 included in the plurality of separator rolls 10 through which the core member 150 is passed can of course have different widths as with in Modification Example 3, provided that an inequality relation of (Formula 11) below is satisfied.

$$L_4 > L_{1,sum} - L_3 (>0) \qquad \text{(Formula 11)}$$

Moreover, the core member 150 can of course be short as with in Modification Example 1. Moreover, the relation $2L_4 < L_{1,sum}$ of course needs to hold true such that the inner surfaces of the protectors 140 can hold the buffering materials 160 through which the core member 150 is passed.

MODIFICATION EXAMPLE 5

In the roll assembly 181, a stretch film can be used instead of the binding band 170 for tying up the roll assembly 180. The stretch film is thin and therefore can be easily torn by human hands without using a tool such as scissors. This makes it possible to disassemble the roll assembly 181, and accordingly the assembled separator rolls 10 can be easily taken out.

Moreover, the stretch film has elasticity, and is therefore deformed along the shape of the protectors 140 when being wound on the roll assembly 180. The stretch film thus deformed is engaged with the protectors 140, and it is therefore unnecessary to provide engaging sections such as the notch grooves 143 in the protectors 140.

The stretch film can of course be used instead of the binding band 170 also in the above described Modification Examples 1 through 4.

MODIFICATION EXAMPLE 6

In the roll assembly 180, the protectors 140 having identical shapes are inserted into the core member 150 at both ends. Note, however, that it is possible to employ protectors having different shapes. For example, in a case where the protector 140 is inserted into the one end of the core member 150 and another protector having a protruding section protruding from a base section by a height $L_5$ is inserted into the another end of the core member 150, it is only necessary that an inequality relation of (Formula 12) below is satisfied, in addition to inequality relations of (Formula 9) and (Formula 9') below.

$$L_4 > L_{1,sum} + L_{2,sum} - L_3 (>0) \qquad \text{(Formula 9)}$$

$$L_5 > L_{1,sum} + L_{2,sum} - L_a (>0) \qquad \text{(Formula 9')}$$

$$L_4 + L_5 < L_{1,sum} + L_{2,sum} \qquad \text{(Formula 12)}$$

(Formula 9') is obtained by substituting $L_4$ in (Formula 9) with $L_5$. In a case where the inequality relations of (Formula 9) and (Formula 12) are satisfied, the height $L_5$ of the protruding section of the another protector is shorter than the length $L_3$ of the core member 150, and it is therefore possible to surely insert the protruding section 142 of the protector 140 into the one end of the core member 150. Similarly, in a case where the inequality relations of (Formula 9') and (Formula 12) are satisfied, the height $L_4$ of the protruding section 142 of the protector 140 is shorter than the length $L_3$ of the core member 150, and it is therefore possible to surely insert the protruding section of the another protector into the another end of the core member 150.

<Effects>

According to the above described configuration, the height $L_4$ of the protruding section 142 of the protector 140 is greater than a value obtained by subtracting the length $L_3$ of the core member 150 from a sum of the total ($L_{1,sum}$) of widths $L_1$ of the cores 8 included in the separator rolls 10 and the total ($L_{2,sum}$) of thicknesses $L_2$ of the buffering materials 160 through which the core member 150 is passed. Therefore, even in a case where a position of the core member 150 is being shifted to one side inside the shaft holes of the separator rolls 10 and the buffering materials 160 through which the core member 150 is passed, the protruding section 142 is surely at least partially inserted into the shaft hole 152 of the core member 150.

Therefore, in the assembling step, even in a case where one protector 140 is inserted into one end of the core member 150 until the end surface of the core member 150 makes contact with the base section 141 of the protector 140, another protector 140 can be inserted into the another end of the core member 150. Moreover, in a case where the position of the core member 150 is shifted when the posture of the roll assembly 180 is changed or the roll assembly 181 is transported, the protectors 140 on both sides are engaged with the core member 150.

As such, the protectors 140 do not fall off from the core member 150, and the roll assemblies 180 and 181 are stable in terms of structure. It is therefore possible to prevent the separator rolls 10 from colliding with each other due to vibration.

According to the above described configuration, the protruding sections 142 of the protectors 140 are respectively inserted into the one end and the other end (opposite to the one end) of the core member 150, and therefore the protectors 140 are engaged with the core member 150 at the both ends. From this, it is possible to suspend the core member 150, which supports the separator rolls 10 through which the core member 150 is passed, by the protectors 140 from both sides. By thus suspending the core member 150, it is possible to secure a space around an outer periphery of the separator rolls 10, and it is therefore possible to protect the separators 12 which are being wound.

According to the above described configuration, the separator rolls 10 and the buffering materials 160 are set to the core member 150 from above to below in the direction of gravity such that the core member 150 passes through the separator rolls 10 and the buffering materials 160. Since the direction in which the core member 150 is passed through the separator rolls 10 and the buffering materials 160 is along the direction of gravity, if is possible to easily stack the separator rolls 10 and the buffering materials 160 while preventing a void from being generated between each of the cores 8 of the separator rolls 10 and each of the buffering materials 160.

According to the above described configuration, the length $L_3$ of the core member 150 is less than a sum of a total ($L_{1,sum}$) of widths $L_1$ of the cores 8 of the separator rolls 10 through which the core member 150 is passed and a total ($L_{2,sum}$) of thicknesses $L_2$ of the buffering materials 160 through which the core member 150 is passed. Therefore, the end surfaces of the core member 150 on both sides can be kept off from the inner surfaces of the base sections 141 of the protectors 140 without contact.

In order to keep the core member 150 off from the base sections 141, each of the roll assemblies 180 and 181 needs to be assembled such that a sum of a total ($L_{2,sum,deformed}$) of thicknesses of the buffering materials 160 through which the core member 150 is passed and are deformed by external force and a total ($L_{1,sum}$) of widths $L_1$ of the cores 8 of the separator rolls 10 through which the core member 150 is passed becomes greater than the length ($L_3$) of the core member 150.

In a case where a plurality of members are made of hard materials and arranged to rub against each other, abrasion dust is more likely to be generated from contact surfaces of the members. Therefore, the core member 150 and the protector 140 which are made of hard materials preferably have small surfaces that rub against each other, and the end surfaces of the core member 150 are preferably kept off from the inner surfaces of the base sections 141 of the protectors 140.

Further, the core member 150 is mostly obtained by cutting a long pipe material by the length $L_3$. In a case where each of the end surfaces of the core member 150 is such a cross section and the end surface of the core member 150 and another hard surface rub against each other, abrasion dust is particularly easily generated from the end surface of the core member 150 because the cross section is rough and the core member 150 is made of the hard material. Moreover, the end surface of the core member 150 damages the another hard surface against which the end surface has rubbed, and therefore abrasion dust is more likely to be generated from the another surface against which the end surface has rubbed. From this, the both end surfaces of the core member 150 particularly preferably do not make contact with the respective base sections 141 of the protectors 140.

In a case where the end surfaces of the core member 150 do not make contact with the respective base sections 141, the end surfaces of the core member 150 accordingly do not rub against the respective protectors 140, and therefore abrasion dust is less likely to be generated. In production of batteries, intrusion of dust is fatal. Therefore, it is extremely important for the separator 12 used in batteries that dust is hardly generated from the roll assemblies 180 and 181. From this, the above described configuration in which abrasion dust is hardly generated is suitable for assembling, storing, and transporting the separator rolls 10.

According to the configuration, as illustrated in FIG. 11, the protectors 140 are inserted into the core member 150 such that the protruding sections 142 of the protectors 140 are inserted into the shaft hole 152 of the core member 150. Therefore, the wall surface of the shaft hole 152 of the core member 150 makes contact with the lateral surfaces of the protruding sections 142. However, the wall surface of the shaft hole 152 of the core member 150 and the lateral surfaces of the protruding sections 142 are smooth surfaces, and therefore dust is hardly generated even in a case where the wall surface of the shaft hole 152 rubs against the lateral surfaces of the protruding sections 142.

According to the configuration as illustrated in (a) of FIG. 11, the buffering materials 160 make contact with the respective base sections 141 of the protectors 140. However, the buffering materials 160 are not made of a hard material, and therefore abrasion dust is hardly generated even in a case where the buffering materials 160 rub against the protectors 140. In production of batteries, intrusion of dust is fatal. Therefore, it is extremely important for the separator 12 used in batteries that abrasion dust is hardly generated from the roll assemblies 180 and 181. From this, the above described configuration in which abrasion dust is hardly generated is suitable for assembling, storing, and transporting the separator rolls 10.

According to the configuration, the core member 150 is alternately passed through the separator rolls 10 and the buffering materials 160. By thus alternately passing the core member 150 through the separator rolls 10 and the buffering materials 160, one (1) buffering material 160 is surely provided between the separator rolls 10. As such, it is possible to mitigate or prevent collision between separator rolls 10 by the smallest number of pieces of the buffering materials 160. Similarly, in a case where the spacers are used, it is preferable that the core member 150 is alternately passed through the separator rolls 10 and the spacers.

According to the configuration, in the step of passing the core member 150 through the separator rolls 10 and the buffering materials 160, the core member 150 is firstly passed through one of the buffering materials 160 and is lastly passed through another one of the buffering materials 160. Therefore, the buffering material 160 is surely sandwiched between the protector 140 and the separator roll 10. By the sandwiched buffering materials 160, it is possible to mitigate or prevent collision of the separator rolls 10 with the protectors 140. Similarly, in a case where the spacers are used, the core member 150 is preferably passed through spacers firstly and lastly.

According to the configuration, the protector 140 which is engaged with the one end of the core member 150 is identical with the protector 140 which is engaged with the other end of the core member 150. Therefore, it is possible to reduce the number of members constituting the roll assemblies 180 and 181, and it is accordingly possible to reduce inventory costs. Moreover, when the roll assemblies 180 and 181 are disassembled, either of the two protectors 140 can be taken off first, and it is therefore easy to disassemble the roll assemblies 180 and 181.

The present invention is not limited to the embodiments, but can be altered by a skilled person in the art within the scope of the claims. An embodiment derived from a proper combination of technical means each disclosed in a different embodiment is also encompassed in the technical scope of the present invention.

[Remarks]

The assembly production method in accordance with an aspect of the present invention includes: a first inserting step of inserting a first protruding section into one end of a core member, the first protruding section protruding from a first base section that is included in a first lateral plate and has a plate-like shape, the first protruding section having a length of $L_4$ and the core member having a length of $L_3$ in a passing-through direction in which the core member is passed through one or more plate members and one or more rolls each of which is obtained by winding a film on a core, and $L_3 > L_4$ holding true; and a passing-through step of passing the core member through the one or more rolls and the one or more plate members such that $L_3+L_4 > L_{1,sum}+L_{2,sum} > L_3$ holds true, where $L_{1,sum}$ is a total length of the one or more rolls in the passing-through direction and $L_{2,sum}$ is a total length of the one or more plate members in the passing-through direction.

Another assembly production method in accordance with an aspect of the present invention includes: a first inserting step of inserting a first protruding section into one end of a core member, the first protruding section protruding from a first base section that is included in a first lateral plate and has a plate-like shape, the first protruding section having a length of $L_4$ and the core member having a length of $L_3$ in a passing-through direction in which the core member is passed through one or more rolls each of which is obtained by winding a film on a core, and $L_3 > L_4$ holding true; and a passing-through step of passing the core member through the one or more rolls such that $L_3+L_4 > L_{1,sum} > L_3$ holds true, where $L_{1,sum}$ is a total length of the one or more rolls in the passing-through direction.

According to the above two production methods, the first protruding section is inserted into the one end of the core member, and therefore the core member hardly falls off from the first lateral plate. Moreover, it is possible that the other end (opposite to the one end) of the core member can be configured not to protrude from the one or more rolls through which the core member is passed or the one or more rolls and the one or more plate members through which the core member is passed. Therefore, the first base section can be arranged to be kept off from the end surface at the one end of the core member. According to the arrangement, the first base section does not rub against the end surface of the core member, and it is therefore possible to reduce generation of abrasion dust.

The assembly production method in accordance with an aspect of the present invention preferably includes a second inserting step of inserting a second protruding section into another end of the core member which another end is opposite to the one end, the second protruding section protruding from a second base section that is included in a second lateral plate and has a plate-like shape, the second protruding section which has a length of $L_5$ being inserted into the another end of the core member such that $L_{1,sum}+L_{2,sum}-L_4 > L_5 > L_{1,sum}+L_{2,sum}-L_3$ holds true.

Another assembly production method in accordance with an aspect of the present invention preferably includes a second inserting step of inserting a second protruding section into another end of the core member which another end is opposite to the one end, the second protruding section protruding from a second base section that is included in a second lateral plate and has a plate-like shape, the second protruding section which has a length of $L_5$ being inserted into the another end of the core member such that $L_{1,sum}-L_4 > L_5 > L_{1,sum}-L_3$ holds true.

According to the two production methods, the second base section can be arranged to be kept off from the end surface at the another end of the core member. With this arrangement, the second base section does not rub against the end surface of the core member, and it is therefore possible to reduce generation of abrasion dust. Even in a case where a position of the core member is being shifted to one side in the one or more rolls and the one or more plate members through which the core member is passed or in the one or more rolls through which the core member is passed, the second protruding section can be surely at least partially inserted into the another end of the core member. Therefore, the core member is less likely to fall off from the second lateral plate. Moreover, the first lateral plate is engaged with the one end of the core member and the second lateral plate is engaged with the another end of the core member. This allows the core member, which supports the one or more rolls, to be suspended by the first and second lateral plates.

In the assembly production method in accordance with an aspect of the present invention, it is preferably that, in the passing-through step, the core member is alternately passed through the one or more rolls and the one or more plate members. According to the method, one (1) plate member can be surely provided between rolls. It is therefore possible to prevent or mitigate collision between the rolls by the smallest number of pieces of the plate members.

In the assembly production method in accordance with an aspect of the present invention, it is preferable that the one or more plate members are a plurality of plate members and, in the passing-through step, the core member is first passed through one of the plurality of plate members and is lastly passed through another one of the plurality of plate members. According to the method, at least one plate member is surely provided between the first lateral plate and the roll and between the second lateral plate and the roll. This makes it possible to prevent or mitigate collision between the roll and the first lateral plate and collision between the roll and the second lateral plate.

In the assembly production method in accordance with an aspect of the present invention, it is preferable that at least one of the one or more plate members is a spacer which is not deformed by external force. In a case where the spacer is provided between the first lateral plate and the roll, between the second lateral plate and the roll, and/or between the rolls, it is possible to secure a space at a part at which the spacer is provided. By such spacing, it is possible to prevent collision between the first lateral plate and the roll, between the second lateral plate and the roll, and/or between the rolls.

In the assembly production method in accordance with an aspect of the present invention, it is preferable that at least one of the one or more plate members is a buffering material which is deformed by external force, and $L_{2,sum}$ is a total of lengths in a state where the buffering material is not being deformed by external force. In a case where the buffering material is provided between the first lateral plate and the roll, between the second lateral plate and the roll, and/or between the rolls, it is possible to cause the buffering material to absorb impact of collision at a part at which the buffering material is provided. By such absorption, it is possible to mitigate collision between the first lateral plate and the roll, between the second lateral plate and the roll, and/or between the rolls.

In a case where the buffering material is used, in the assembly production method in accordance with an aspect of the present invention, it Is preferable that the second protruding section is inserted into the another end of the core member in the second inserting step such that $L_{1,sum}+L_{2,sum,deformed} \geq L_3$ holds true, where $L_{2,sum,deformed}$ is a total of lengths of the one or more plate members in a state where the buffering material is deformed by external force in the passing-through direction. According to the method, a distance between a surface of the first base section from which surface the first protruding section protrudes and a surface of the second base section from which surface the second protruding section protrudes is equal to or greater than the length $L_3$ of the core member. Therefore, end surfaces of the core member on both sides are less likely to rub against the first base section and the second base section, respectively. With the arrangement, abrasion dust is hardly generated between (i) the end surfaces of the core member on both sides and (ii) respective of the first base section and the second base section.

In the assembly production method in accordance with an aspect of the present invention, it is preferable that, in the passing-through step, the passing-through direction, is a direction of gravity. According to the method, the one or more rolls and the one or more plate members through which the core member is passed or the rolls through which the core member is passed are stacked in the direction of gravity. By the gravity, it is possible to easily stack the rolls and the plate members such that no void is generated between the core of the roll and the plate member, between the cores of the rolls, and between the plate members. With the arrangement, it is possible to reduce a space for the rolls to move in the assembly. It is therefore possible to prevent collision between the rolls, between the roll and the first lateral plate, and between the roll and the second lateral plate.

The assembly production method in accordance with an aspect of the present invention preferably includes a binding step of binding the first lateral plate and the second lateral plate with a band member, the binding step being carried put after the first inserting step, the passing-through step, and the second inserting step. According to the method, a distance between the first lateral plate and the second lateral plate is restricted, and it is therefore possible to prevent the core member from falling off from the first lateral plate or the second lateral plate. This makes it possible to prevent a void from being generated between the core of the roll and the plate member, between the cores of the rolls, and between the plate members.

In a case where the buffering material is used, the assembly production method in accordance with an aspect of the present invention preferably includes a binding step of binding the first lateral plate and the second lateral plate with a band member such that $L_{1,sum}+L_{2,sum,deformed} \geq L_3$ holds true, the binding step being carried out after the first inserting step, the passing-through step, and the second inserting step. According to the method, the distance between the first lateral plate and the second lateral plate is restricted, and it is therefore possible to prevent the core member from falling off from the first lateral plate or the second lateral plate. This makes it possible to prevent a void from being generated between the core of the roll and the plate member, between the cores of the rolls, and between the plate members. Moreover, according to the method, a distance between a surface of the first base section, from which surface the first protrriding section protrudes and a surface of the second base section from which surface the second protruding section protrudes is equal to or greater than the length $L_3$ of the core member. Therefore, end surfaces of the core member on both sides are less likely to rub against the first base section and the second base section, respectively. With the arrangement, abrasion dust is hardly generated between (i) the end surfaces of the core member on both sides and (ii) respective of the first base section and the second base section.

In the assembly production method in accordance with an aspect of the present invention, it is preferable that, in the binding step, the band member is engaged with a first engaging section provided in the first lateral plate and a second engaging section provided in the second lateral plate. According to the method, the band member is engaged with the first engaging section and the second engaging section, and therefore the band member hardly comes off from the first lateral plate and the second lateral plate. In a case where the first engaging section and the second engaging section serve as guiding sections for guiding the band member to appropriate positions, it is possible to easily bind the first lateral plate and the second lateral plate such that the band member is not loosened.

In the assembly production method in accordance with an aspect of the present invention, it is preferable that the band member is a stretch film. According to the method, the stretch film is used, and it is therefore possible to easily tear the stretch film by human hands without using a tool such as scissors. This makes it possible to disassemble the assembly, and accordingly the assembled rolls can be easily taken out.

In the assembly production method in accordance with an aspect of the present invention, the one or more rolls are preferably a plurality of rolls. According to the method, the plurality of rolls can be assembled into one (1) assembly.

In the assembly production method in accordance with an aspect of the present invention, the film is preferably a battery separator. The assembly produced by the assembly production method in accordance with an aspect of the present invention hardly generates abrasion dust, and is particularly suitable for storage, transportation, and the like of a roll obtained by winding a battery separator.

In an assembly in accordance with an aspect of the present invention, a first protruding section is inserted into one end of a core member, the first protruding section protruding from a first base section that is included in a first lateral plate and has a plate-like shape, the first protruding section having a length of $L_4$ and the core member having a length of $L_3$ in a passing-through direction in which the core member is passed through one or more plate members and one or more rolls each of which is obtained by winding a film on a core, and $L_3 > L_4$ holding true; and the core member is passed through the one or more rolls and the one or more plate members such that $L_3 + L_4 > L_{1,sum} + L_{2,sum} > L_3$ holds true, where $L_{1,sum}$ is a total length of the one or more rolls in the passing-through direction and $L_{2,sum}$ is a total length of the one or more plate members in the passing-through direction.

In another assembly in accordance with an aspect of the present invention, a first protruding section is inserted into one end of a core member, the first protruding section protruding from a first base section that is included in a first lateral plate and has a plate-like shape, the first protruding section having a length of $L_4$ and the core member having a length of $L_3$ in a passing-through direction in which the core member is passed through one or more rolls each of which is obtained by winding a film on a core, and $L_3 > L_4$ holding true; and the core member is passed through the one or more rolls such that $L_3 + L_4 > L_{1,sum} > L_3$ holds true, where $L_{1,sum}$ is a total length of the one or more rolls in the passing-through direction.

According to the above two configurations, the first protruding section is inserted into the one end of the core member, and therefore the core member hardly falls off from the first lateral plate. Moreover, it is possible that the other end of the core member can be configured not to protrude from the rolls through which the core member is passed or the rolls and the plate members through which the core member is passed. Therefore, the first base section can be arranged to be kept off from the end surface at the one end of the core member. According to the arrangement, the first base section does not rub against the end surface of the core member, and it is therefore possible to reduce generation of abrasion dust.

INDUSTRIAL APPLICABILITY

The present invention can be used in assembling rolls in each of which a film is wound on a core.

REFERENCE SIGNS LIST 8, c, u, l: Core
10: Separator roll (roll)
12: Separator (film, battery separator)
140: Protector (first lateral plate, second lateral plate)
141: Base section (first base section, second base section)
142: Protruding section (first protruding section, second protruding section)
143: Notch groove (engaging section)
150: Core member
160: Buffering material (plate member)
170: Binding band (band member)
180: Roll assembly (assembly)
181: Roll assembly (assembly)

The invention claimed is:

1. An assembly production method, comprising:
a first inserting step of inserting a first protruding section into one end of a core member, the first protruding section protruding from a first base section that is included in a first lateral plate and has a plate-like shape, the first protruding section having a length of $L_4$ and the core member having a length of $L_3$ in a passing-through direction in which the core member is passed through one or more plate members and one or more rolls each of which is obtained by winding a film on a core, and $L_3 > L_4$ holding true;
a passing-through step of passing the core member through the one or more rolls and the one or more plate members such that $L_3 + L_4 > L_{1,sum} + L_{2,sum} > L_3$ holds true, where $L_{1,sum}$ is a total length of the one or more rolls in the passing-through direction and $L_{2,sum}$ is a total length of the one or more plate members in the passing-through direction; and
a second inserting step of inserting a second protruding section into another end of the core member which another end is opposite to the one end, the second protruding section protruding from a second base section that is included in a second lateral plate and has a plate-like shape, the second protruding section which has a length of $L_5$ being inserted into the another end of the core member such that $L_{1,sum} + L_{2,sum} - L_4 > L_5 > L_{1,sum} + L_{2,sum} - L_3$ holds true.

2. The assembly production method as set forth in claim 1, wherein:
the one or more plate members are a plurality of plate members;
the core member is firstly passed through one of the plurality of plate members and is lastly passed through another one of the plurality of plate members in the passing-through step; and
the core member is alternately passed through the one or more rolls and the plurality of plate members in the passing-through step.

3. The assembly production method as set forth in claim 1, wherein:
at least one of the one or more plate members is a spacer which is hardly deformed by external force.

4. The assembly production method as set forth in claim 1, wherein:
at least one of the one or more plate members is a buffering material which is easily deformed by external force; and
$L_{2,sum}$ is a total of lengths of the one or more plate members in a state where the buffering material is not deformed by external force.

5. The assembly production method as set forth in claim 4, wherein:
the second protruding section is inserted into the another end of the core member in the second inserting step such that $L_{1,sum} + L_{2,sum,deformed} \geq L_3$ holds true,
where $L_{2,sum,deformed}$ is a total of lengths of the one or more plate members in a state where the buffering material is deformed by external force in the passing-through direction.

6. The assembly production method as set forth in claim 1, wherein:
in the passing-through step, the passing-through direction is a direction of gravity.

7. The assembly production method as set forth in claim 1, further comprising:
   a binding step of binding the first lateral plate and the second lateral plate with a band member, the binding step being carried out after the first inserting step, the passing-through step, and the second inserting step.

8. The assembly production method as set forth in claim 7, wherein:
   at least one of the one or more plate members is a buffering material which is easily deformed by external force; and
   the first lateral plate and the second lateral plate are bound with the band member in the binding step such that $L_{1,sum}+L_{2,sum,deformed} \geq L_3$ holds true,
   where $L_{2,sum}$ is a total of lengths of the one or more plate members in a state where the buffering material is not deformed by external force, and $L_{2,sum,deformed}$ is a total of lengths of the one or more plate members in a state where the buffering material is deformed by external force in the passing-through direction.

9. The assembly production method as set forth in claim 7, wherein:
   in the binding step, the band member is engaged with a first engaging section provided in the first lateral plate and a second engaging section provided in the second lateral plate.

10. The assembly production method as set forth in claim 7, wherein:
    the band member is a stretch film.

11. The assembly production method as set forth in claim 1, wherein:
    the one or more rolls are a plurality of rolls; and
    the film is a battery separator.

12. An assembly production method, comprising:
    a first inserting step of inserting a first protruding section into one end of a core member, the first protruding section protruding from a first base section that is included in a first lateral plate and has a plate-like shape, the first protruding section having a length of $L_4$ and the core member having a length of $L_3$ in a passing-through direction in which the core member is passed through one or more rolls each of which is obtained by winding a film on a core, and $L_3 > L_4$ holding true;
    a passing-through step of passing the core member through the one or more rolls such that $L_3+L_4 > L_{1,sum} > L_3$ holds true, where $L_{1,sum}$ is a total length of the one or more rolls in the passing-through direction; and
    a second inserting step of inserting a second protruding section into another end of the core member which another end is opposite to the one end, the second protruding section protruding from a second base section that is included in a second lateral plate and has a plate-like shape, the second protruding section which has a length of $L_5$ being inserted into the another end of the core member such that $L_{1,sum}-L_4 > L_5 > L_{1,sum}-L_3$ holds true.

13. The assembly production method as set forth in claim 12, wherein:
    in the passing-through step, the passing-through direction is a direction of gravity.

14. The assembly production method as set forth in claim 12, further comprising:
    a binding step of binding the first lateral plate and the second lateral plate with a band member, the binding step being carried out after the first inserting step, the passing-through step, and the second inserting step.

15. The assembly production method as set forth in claim 14, wherein:
    in the binding step, the band member is engaged with a first engaging section provided in the first lateral plate and a second engaging section provided in the second lateral plate.

16. The assembly production method as set forth in claim 14, wherein:
    the band member is a stretch film.

17. The assembly production method as set forth in claim 12, wherein:
    the one or more rolls are a plurality of rolls; and
    the film is a battery separator.

* * * * *